(12) United States Patent
Nikain et al.

(10) Patent No.: US 11,354,152 B2
(45) Date of Patent: Jun. 7, 2022

(54) SELF-EVOLVING MICROSERVICES

(71) Applicant: AT&T Intellectual Property I, L.P., Atlanta, GA (US)

(72) Inventors: Mohammad Nikain, Atlanta, GA (US); Daniel Connolly, Suwanee, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 145 days.

(21) Appl. No.: 16/937,206

(22) Filed: Jul. 23, 2020

(65) Prior Publication Data
US 2022/0027192 A1 Jan. 27, 2022

(51) Int. Cl.
G06F 9/46 (2006.01)
G06F 9/48 (2006.01)
G06N 3/12 (2006.01)

(52) U.S. Cl.
CPC .......... G06F 9/4843 (2013.01); G06N 3/126 (2013.01)

(58) Field of Classification Search
CPC .............................. G06F 9/4813; G06N 3/126
See application file for complete search history.

(56) References Cited

U.S. PATENT DOCUMENTS

| | | | |
|---|---|---|---|
| 8,181,153 B2 | 5/2012 | Grechanik | |
| 2002/0147771 A1 | 10/2002 | Traversat et al. | |
| 2016/0124742 A1 | 5/2016 | Rangasamy et al. | |
| 2017/0374180 A1 | 12/2017 | Gowda et al. | |
| 2018/0121221 A1 | 5/2018 | Ahuja et al. | |
| 2018/0307524 A1 | 10/2018 | Vyas et al. | |
| 2019/0089750 A1* | 3/2019 | Hassan | H04L 65/1053 |
| 2019/0340088 A1 | 11/2019 | Sanakkayala et al. | |
| 2020/0133744 A1 | 4/2020 | MacLeod et al. | |
| 2020/0133795 A1 | 4/2020 | Rhodes et al. | |
| 2020/0195526 A1 | 6/2020 | Eberlein et al. | |
| 2020/0249994 A1 | 8/2020 | Hrivnak et al. | |

* cited by examiner

*Primary Examiner* — Camquy Truong
(74) *Attorney, Agent, or Firm* — Guntin & Gust, PLC; John G. Rauch

(57) ABSTRACT

Methods, systems, and apparatuses may provide for managing or operating self-evolving microservices. A method, system, computer readable storage medium, or apparatus may provide for receiving a message associated with a service, wherein the message is for a first microservice that contributes to the implementation of the service, wherein the first microservice comprises a plurality of rules; and subsequent to receiving the message, creating an evolved first microservice using a second rule of a plurality of rules of a second microservice.

20 Claims, 18 Drawing Sheets

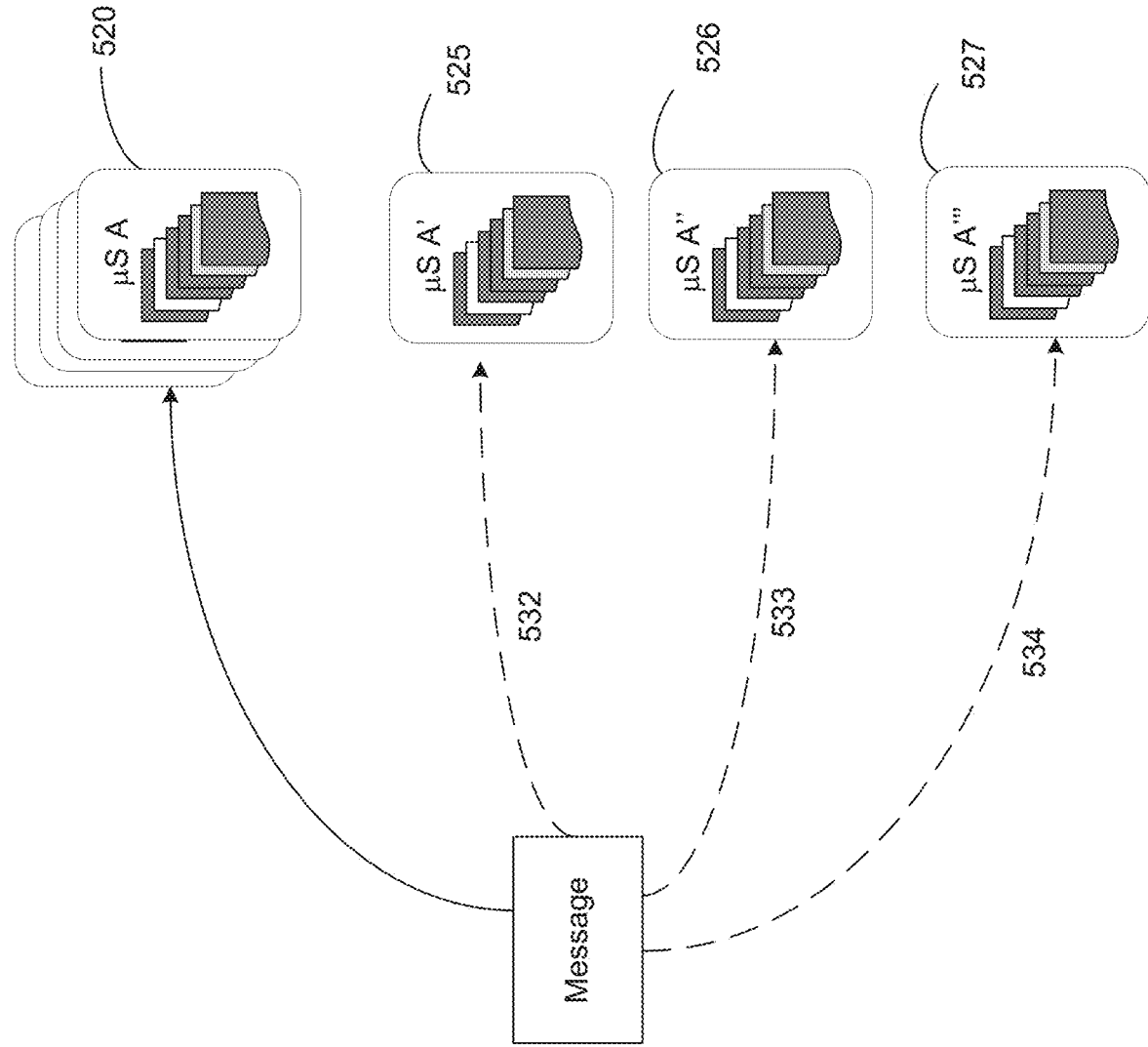

SELF-EVOLVING MICROSERVICES

TECHNICAL FIELD

The present disclosure relates to the management of systems with interrelated services. More particularly, the disclosure relates to a method, system, and computer program for managing systems with interrelated microservices with self-assembling, self-evolving, or self-configuring microservices.

BACKGROUND

The traditional methods in managing an OSS infrastructure involve planning the OSS functionality and interconnections (e.g. interface agreements), by a central team of architects/engineers. After each OSS module is ready, each of its interfaces is "integration tested" with other systems (typically called end-to-end test) and is then put into production.

In a microservices environment, the "architect" team has to consider N-times more components (evolving on different schedules) and N-Squared a greater number of interfaces which, due to their numbers, can easily fall out of sync (in terms of compatibility). The end result introduces a number of problems. One problem is that revisions get out of sync (one microservice upgrades and breaks other microservices downstream, e.g. its clients). Another problem is that load balancing becomes a major issue as it is difficult to foresee how microservices put loads on other microservices, resulting in slow performance and crashes. Yet another problem occurs when microservices functionality overlaps with other microservices or gaps are introduced into the infrastructure which are not covered by any microservices. With the use of microservices troubleshooting becomes very difficult since it is not easily understood whether the problem is with one microservice, its downstream services, or a design flaw. These issues hinder the migration to microservices, cause the microservices-based OSS infrastructure to not function properly, or both, which in either case can result in significant operations cost along with loss of productivity and savings opportunities.

This background information is provided to reveal information believed by the applicant to be of possible relevance. No admission is necessarily intended, nor should be construed, that any of the preceding information constitutes prior art.

SUMMARY

Methods, systems, and apparatuses, among other things, as described herein may provide for managing or operating self-evolving microservices. A method, system, computer readable storage medium, or apparatus may provide for receiving a message associated with a service, wherein the message is for a first microservice that generates results that contribute to the implementation of the service, wherein the first microservice comprises a plurality of rules; and subsequent to receiving the message, creating an evolved first microservice, wherein the creating of the evolved first microservice comprises: obtaining the plurality of rules of the first microservice; and replacing a first rule of the plurality of rules of the first microservice with a second rule of a plurality of rules of a second microservice. The method, system, computer readable storage medium, or apparatus may provide for processing the message using the first microservice to obtain a first result of the results, wherein the first result contributes to the implementation of the service; processing the message using the evolved first microservice to obtain an evolved result, wherein the evolved result is used for evaluation of a potential implementation of the service; obtaining operational parameters for the processing of the first microservice; obtaining operational parameters for the processing of the evolved first microservice; comparing the operational parameters for the processing of the first microservice with the operational parameters for the processing of the evolved first microservice; and based on the comparing of the operational parameters for the processing of the first microservice with the operational parameters for the processing of the evolved first microservice, using the evolved first microservice for subsequent implementation of the service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 7B illustrates an exemplary message flow for self-evolving microservices.

DETAILED DESCRIPTION

Figure 1:
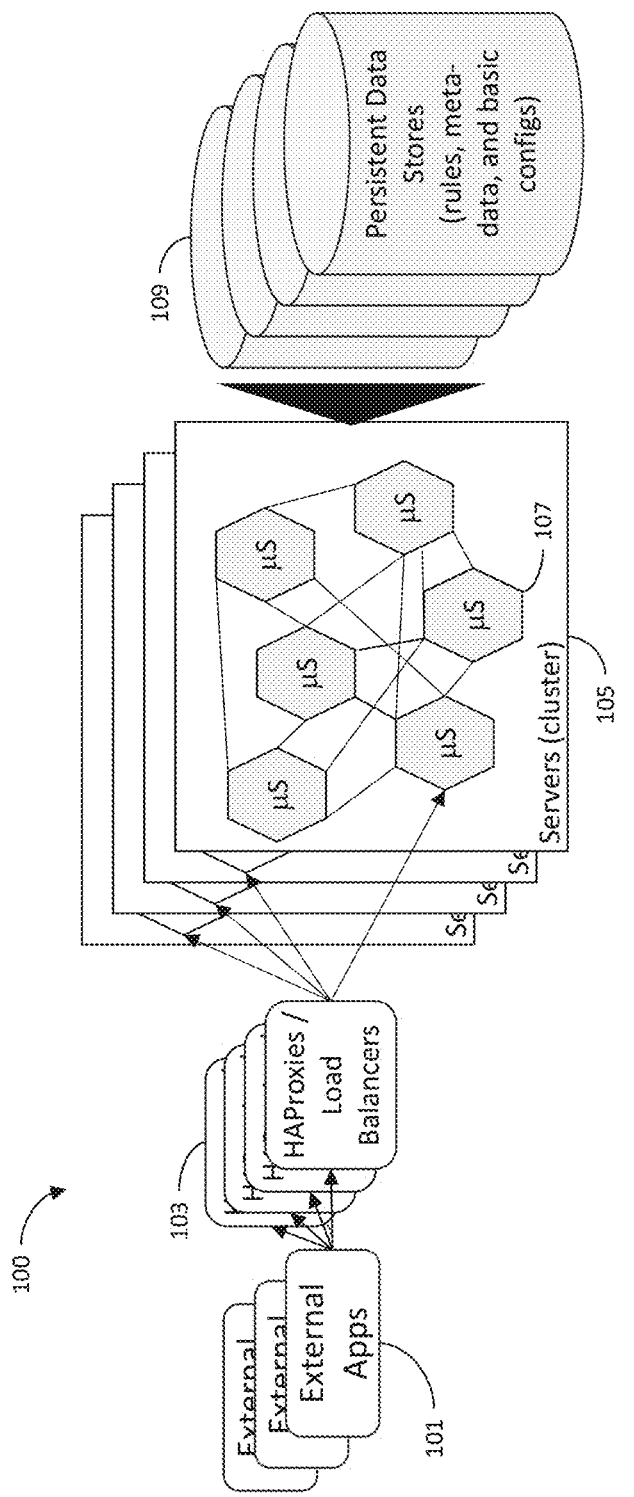
FIG. 1 is a block diagram of a system architecture 100 for self-managed microservices.

Illustrated in FIG. 1 is an exemplary block diagram of a system architecture 100 for self-managed microservices (e.g., self-assembling, self-evolving, or self-configuring microservices). The system architecture 100 includes a plurality of external applications 101 that may access a plurality of HAP proxies/load balancers 103 which in turn may access a plurality of servers 105 each having a plurality of microservices 107 (each referred to as a µS in the drawings). The plurality of microservices 107 in a server may be referred to as a colony. In one example the microservices 107 may access persistent data stores 109 which may store rules, metadata, or basic configurations.

Figure 2:
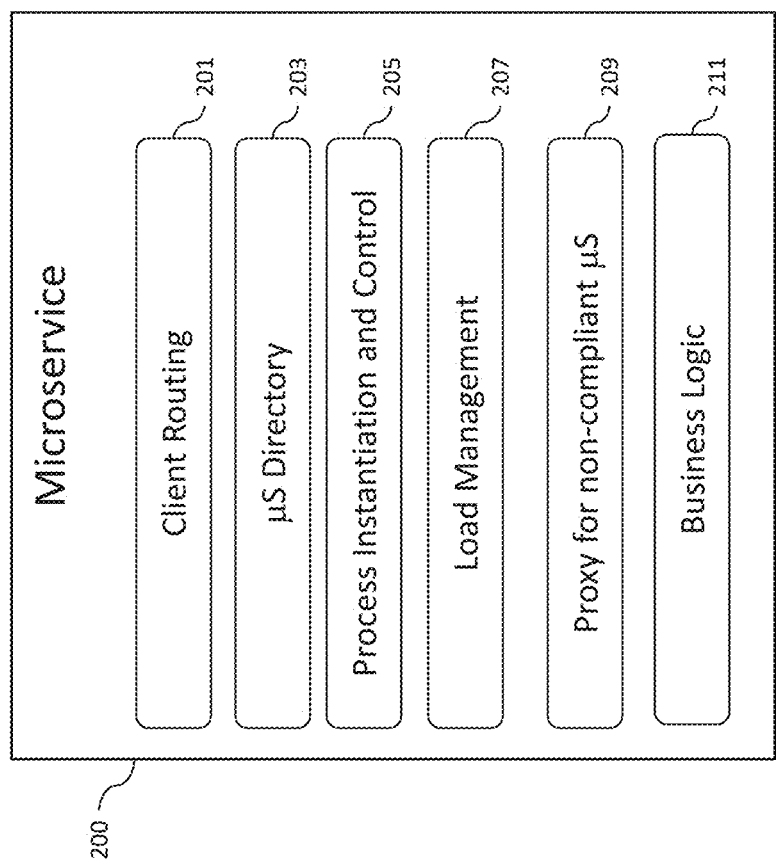
FIG. 2 is an illustration of the components of a self-managed microservice.

Self-managed microservices are provided through a microservice 200, illustrated in FIG. 2 comprising a client routing component 201, a microservice directory component 203, a process instantiation and control component 205, a load management component 207, a proxy component for noncompliant microservices 209, or a business logic component 211. The microservice 200 may run in a docker container.

The client routing component 201 may provide requests proxy and client redirect capabilities to the microservice 200. The client routing component 201 may act as a proxy for the clients in the event that the client request needs to be redirected to another microservice. This component may be a part of each compliant microservice 200. If the microservice receives a request that is not served by that microservice, the request may be routed to a stem service. This routing may be handled by sending the client an HTTP redirect response (e.g. HTTP 301 or HTTP 302) to the client with the URL of the stem service, or by proxying the request (e.g. such as in an HTTP proxy), or other mechanism to ensure client's requests are routed to the stem service.

Microservice directory component 203 may provide a directory exchange protocol or store directory information about the microservices operating in servers 105. The directory may include a set of records each having a destination microservice's name, destination information (e.g. URL), service type, timestamp, add/delete flag, load indicator, or a verified/unverified flag. The add/delete flag may be used to know whether a record is added or deleted. The verified/unverified flag may be used to determine whether a microservice has direct knowledge of the destination microservice which means the destination is the microservice itself (each microservice has itself in its directory also), or that the microservice has directly attempted to contact the destination microservice. If a direct contact succeeds, then an "add" record is added; if a direct contact fails, then a "delete" record may be added. (both may be considered "verified"). Once there is a change in records, a notification may be sent to the microservices in the directory about the change (directory update). If a directory update is received by microservice A, then the microservice A's directory records may be updated with the incoming records with the following notes:

1. If an existing record is "verified" and the corresponding incoming record is "unverified" the incoming record is ignored.
2. If both incoming and existing records are 'verified,' then the one with the most recent timestamp wins.
3. If there is only one 'add' or 'delete' record per destination microservice; the most recent timestamp wins with the above two exceptions (e.g., unverified records do not replace verified records).

Each microservice may receive a directory request an issue in response to a directory request. The microservices may randomly communicate with each other and a microservice with a directory may provide the directory (list of hosts or ports) to other microservices. In an example the microservice directory component 203 may include a database including the addresses of microservices in the colony. In operation, the microservice directory component 203 in a microservice A may send a communication to a microservice B. If the microservice A does not receive a response, it may determine (e.g., sense) that microservice B is dead (e.g., not working or not available) and updates the record in the directory. The updated record may then be communicated to the microservices in the colony, thus ensuring the reliability of the directory among the microservices in the colony.

The process instantiation and control component 205 may provide the capability of stem service and morphing based on the rules/meta-data-driven arrangement. This may be done by the stem process loading the metadata (e.g., rules and/or configuration information) for the target process. Since these processes may be meta-data driven, once loaded in the new meta-data (e.g., rules and configs) the process may behave like the target process. Note that specific code may also be loaded for the target microservice and let it attach to (e.g., takeover) the current URL. This way, the next request may be serviced by the "logic" that is loaded into the microservice (e.g., the logic may be the metadata or the new code that is attached to the URL).

The load management component 207 may provide load exchange protocols and self-destruct dissemination protocol to enable leader's selection process for controlling the number of stem services active in the system. The directory service may include "load indicators" that show a process's performance measure. These are one or more indicators showing the performance of the microservice as compared to specifications. (e.g. throughput is 50% of specs, etc.).

The load management component 207 may ensure that when a microservice is finding a target (e.g., routing a client request or itself trying to connect to another service), the microservice may consider the load indicator value and if it determines that the performance is too low, the microservice may route the request to a stem service to instantiate a new destination instance. Note that the stem service may also be running the same component so it may make the same determination and morph into that target as opposed to routing the request to it. Also, note that during this transfer, the target's performance might improve, and if so, the stem service may just route the request into it as opposed to starting another copy.

If a microservice finds itself idling (e.g., its load indicators are too low, showing very low utilization), then it may enter a leader selection algorithm with other copies of itself which are also in low utilization. And once a leader is selected, the leader may shut itself down allowing the remaining copies to handle the load. The leader selection algorithm may be one of many that exist that elects a single microservice among the set and ensures each microservice agrees to the single leader.

The proxy component for noncompliant microservices 209 may provide proxy routing and docker/Kubernetes drivers. There are several ways to do this. In the methods, a "proxy" microservice (A) may have the standard components (directory service, load management, etc.) plus the ability to start and stop the actual microservice being proxied (B). Also, when A starts B, it should know how to route requests to and from B. Depending on the architecture of B, A may proxy requests to and from B (e.g., client sends to A, A sends to B, B responds to A, and A relays to the client) or can redirect client requests to B (using, for example, HTTP redirects such as HTTP 301 and HTTP 302). A may also monitor B's logs and provide performance information (e.g. load indicators), etc. based on this information. Depending on abilities of B, some of the functions may be limited (e.g. if B does not report its load numbers, then A cannot report accurate load numbers and the load balancing of B will be limited).

The core of a microservice may be its business logic that implements the business rules. The business logic component 211 may provide implementation of the business objects, rules, and policies. For example, a simple microservice may receive a request for data, get the data, verify a zip code, and send the response.

The present disclosure introduces several concepts that may eliminate infrastructure services that were disclosed in U.S. application Ser. No. 16/516,160. The infrastructure services may be the directory service, which would track location of microservices; or the host resources services, which would start new microservices as they were needed. The present disclosure may replace one or more of the infrastructure services by introducing a "stem-service" which may be considered the 'stem cell' version of a microservice. This 'stem-service' can morph into any microservice and also has the ability to start other microservices.

In an example the directory service may be a virtual directory service. The directory may be a virtual entity realized through a plurality of microservice directory components 203 and a distributed protocol to exchange directory services among each microservice (e.g., so each has view of the entire directory). This may be accomplished by each microservice 200 broadcasting any changes it "directly senses" in the collection of microservices (colony) to others. These changes may include when a microservice morphs into another microservice, when a microservice starts up, or when a microservice ceases to function or respond (dies). This may be sent by another microservice whose request to the "dead" microservice fails, and hence learns of the "death". The microservice directory component 203 may send only "directly sensed" changes to other microservices to avoid a catastrophic flood of exchanges (e.g., exchanges relayed back and forth among nodes). The host resources microservice may be replaced by two features (stem services and the ability of each microservice to spin up a stem service) along with leveraging the enhanced load balancing and routing features.

Stem-services, may be considered microservices that can morph (e.g., convert) into any other microservice (e.g., behave similar to a stem cell). The morphing (or "expression" in biological terms) may be accomplished by the stem service loading rules of the new microservice (the system is primarily rule-based, so loading new rules change the behavior of the service). For example, stem service A may morph into stem service B as follows. Initially stem service A may be bound to a port (for example, it is sitting at a URL http://www.ms.com:8080/svcA.

Example 1

1. stem service A detaches from the port (now 8080 is free on this host)
2. stem service A starts stem service B and gives it port 8080 to use
3. stem service B is started and is now listening on http://www.ms.com:8080/svcB
4. stem service A shuts itself down Example 2

If process A can load new metadata in real-time, it will just dump its metadata (rules) and loads the new metadata (rules). Once these new rules/metadata are loaded, it will start responding to http://www.ms.com:8080/svcB instead of http://www.ms.com:8080/svcA.

In an example, the rules for microservices in the colony may be stored in each microservice so that each microservice will have the rules for the other microservices. In another example each microservice may have access to the rules stored in a central database.

In an example, the system may support services which are non-compliant (e.g., do not follow the rules of the regular self-assembling/self-configuring microservice) through having an microservice be a proxy for these services. The proxy may be a microservice that is compliant and whose job may be to direct request to and from noncompliant microservices. The proxies may know how to load, shutdown, or route to the non-compliant microservice; so, in the case of a stem-service morphing (expressing) into a non-compliant microservice, it may just load the proxy's rules and those rules may be used to instantiate the non-compliant microservice and route traffic to it.

Once a stem-service is morphed (e.g., expressed into a specific microservice), the newly "born" microservice may advertise itself as usual and the distributed directory service (e.g., all other microservices) will know of its creation.

The second feature to replace the host services may be the ability of each one of the microservices to startup a stem-service and then morph/express into the needed microservice. Starting up just one service type is simple enough that it is practical for all microservices to do it (a simple routine available in each microservice base code). The trigger to start a stem-service is described below.

There may be no change to a microservice shutting itself down due to excessive number. This may be accomplished by leader selection and then the leader terminating itself. Leader election coordinate the actions performed by a collection of collaborating microservices by electing one microservice as the leader that assumes responsibility for managing the others. This may help to ensure that microservices do not conflict with each other, cause contention for shared resources, or inadvertently interfere with the work that other microservices are performing. The startup process may be simplified in that rather than starting up the needed microservice, microservices may only spin up stem-services regardless of what is needed. Then the stem-service may morph into any needed microservice.

This "morphing" on demand is handled according to a set of protocols specified below. The morphing on demand process may require sufficient stem-services to be available so they can morph as needed; therefore, the microservices may be configured to require a minimum set of stem-services available; if this number is below a minimum in the distributed directory, then a stem-service may be spun up. The minimum number of stem services may be determined by the network operator based on performance parameters. Multiple microservices may detect this lack of sufficient stem-services, so the same leader selection process described above may be used here so only one stem-service is spun up. The same process may be repeated until the minimum number is running.

The morphing of a stem-service to a specific microservice may be handled through a pseudo-random routing ability available in each microservice. This algorithm may include the following: a) If a microservice receives a request that doesn't belong to it, it will reroute the client (e.g. through HTTP 301/302 codes or RESTful routing) to an instance of a stem-service; and b) if a stem service receives a request, it will check the directory for that microservice, if it finds one, it will route the client to it; otherwise, it will morph into the microservice that will handle that request (e.g., the stem-services do not natively handle any request, so a request they receive may be interpreted as a request that was destined to some other microservice).

FIGS. 3A-3G illustrate an exemplary operation of microservices and stem services.

Figure 3A:
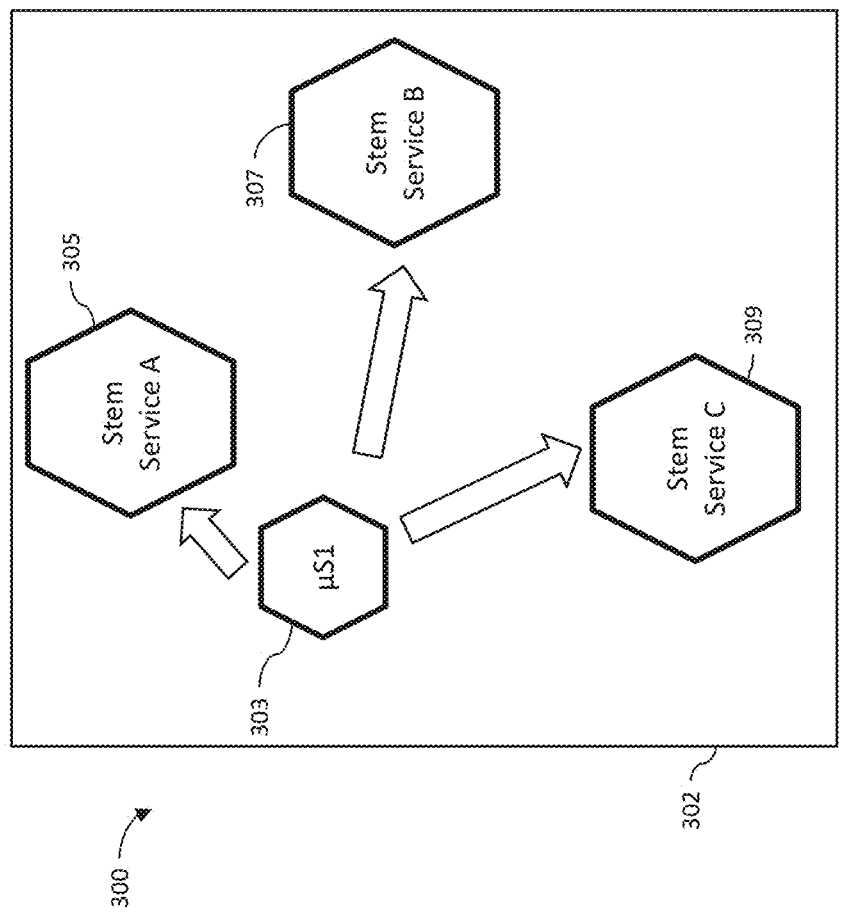
FIGS. 3A-3G are block diagrams illustrating the operation of self-managed microservices and stem services.
Figure 3:
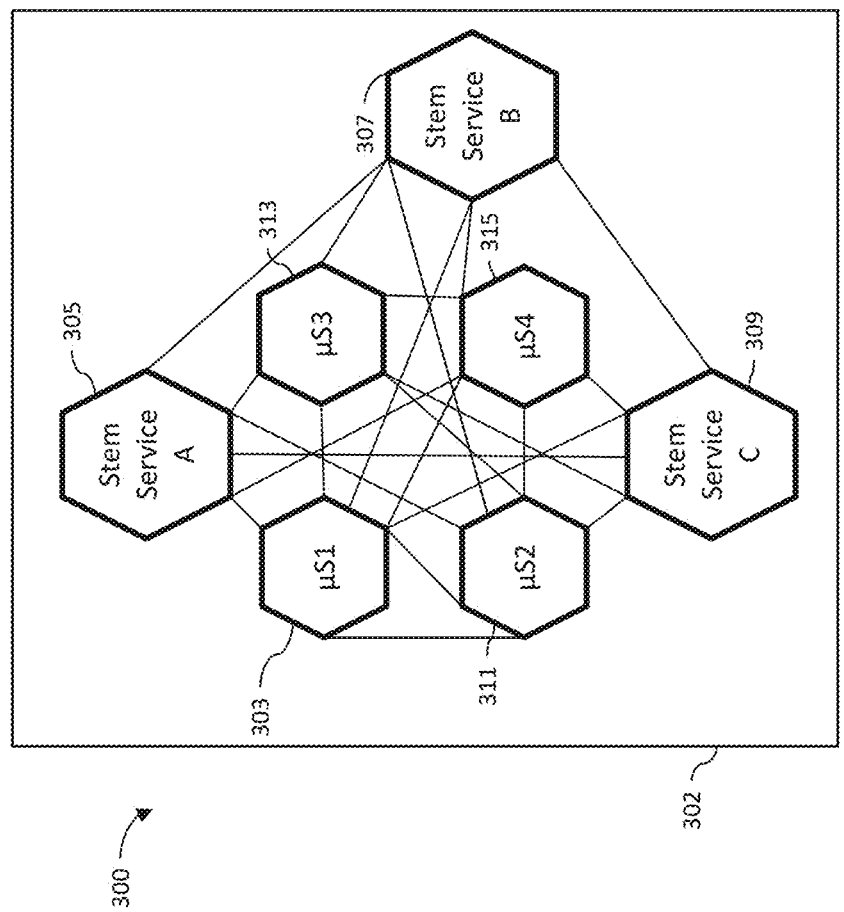
Figure 3C:
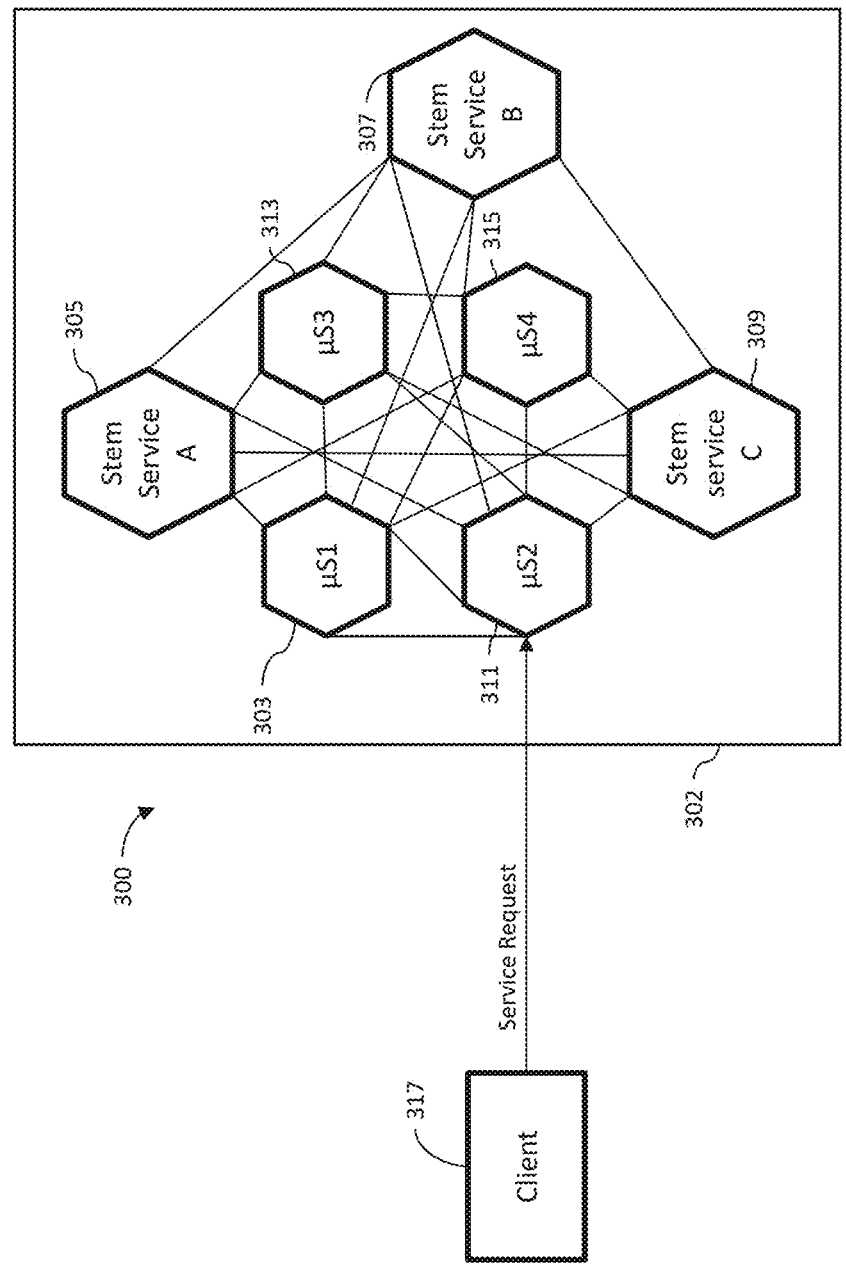

In FIG. 3A, an initial microservice μS1 303 is spun up in server 302. Upon being spun up, μS1 303 determines if there are a minimum number of stem services. If there are not a minimum number of stem services μS1 303 will spin up a stem service (Stem A 305). The microservice will again determine if there are a minimum number of microservices, and if not, it will spin up additional Stem services (Stem Service B 307 and Stem service C 309).

FIG. 3B illustrates an example of colony of microservices (μS1 303, μS2 311, μS3 313, and μS4 315) and stem services (Stem Service A 305, Stem Service B 307 and Stem Service C 309). Only four microservices and three stem services are shown but more are contemplated as part of this disclosure.

FIG. 3B illustrates an example of what happens when a client 317 submits a service request to the server 302. The service request may be routed to a stem service or a microservice (e.g. μS2 311) using pseudo-random routing. The microservice that receives the request (μS2 311) determines whether it can process the request. If the microservice (μS2 311) can process the request it will do so.

Figure 3D:
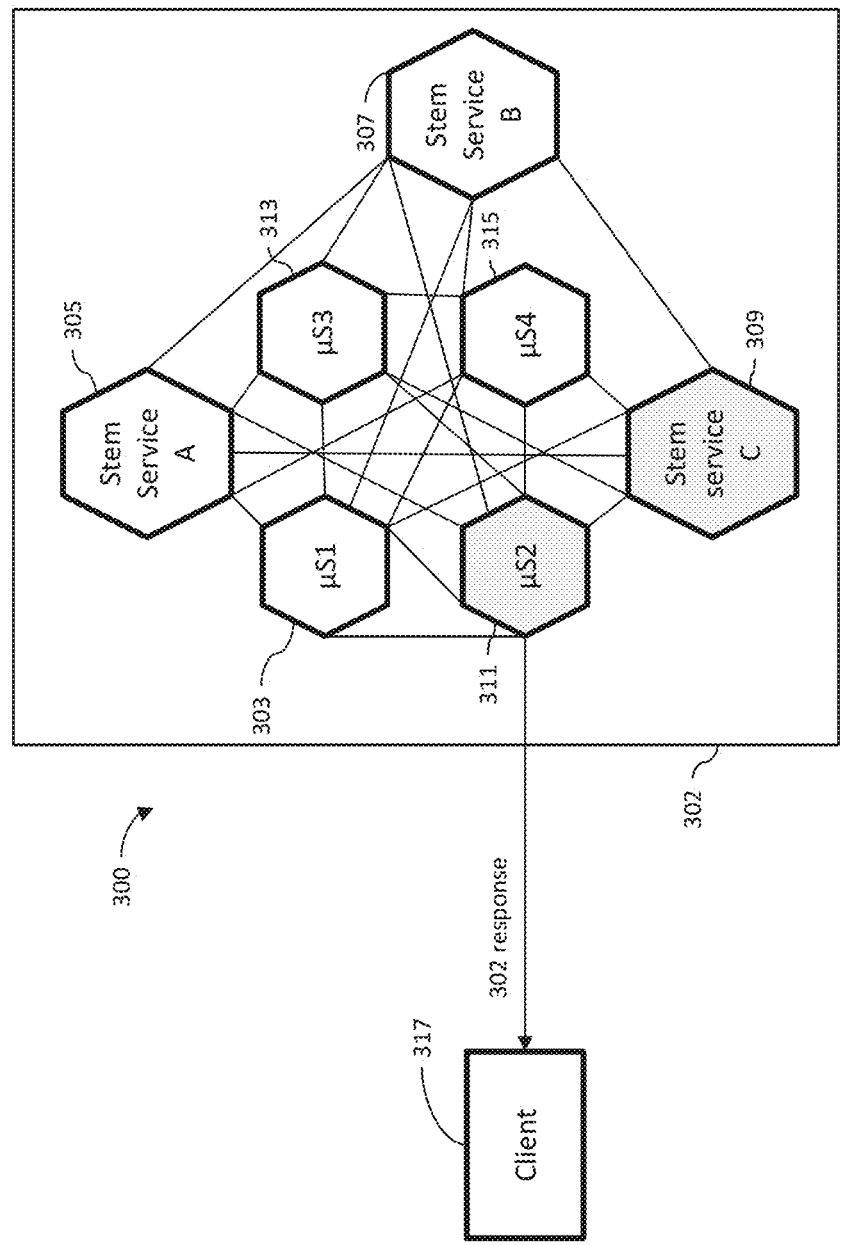

If the microservice μS2 311 cannot process the request, it may route the request to a stem service (e.g. Stem Service C 309 in FIG. 3D). The μS2 311 may send a response (e.g., HTTP 302 response) back to the client 317 and obtain the URL for the stem service. The client 317 then knows where to send the request because of the response.

Figure 3E:
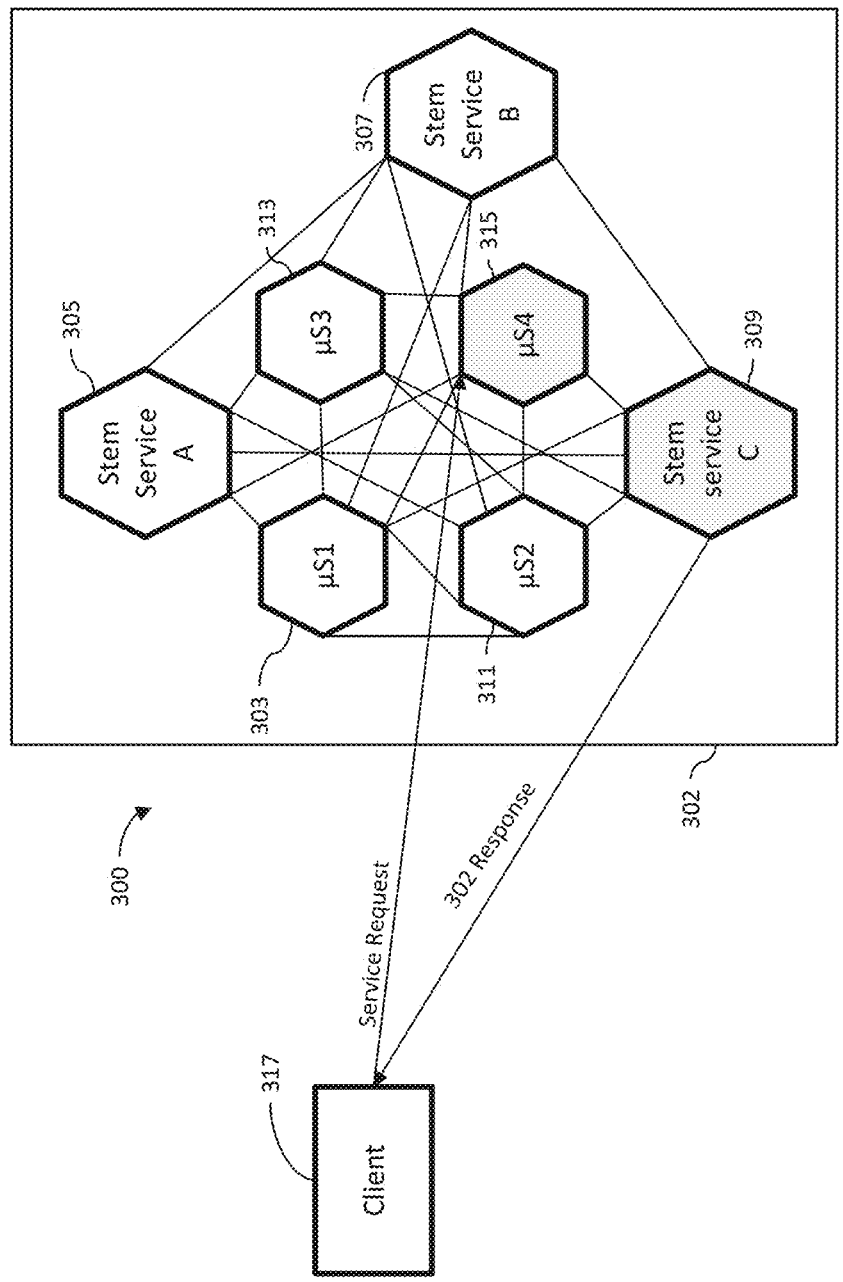
Figure 3:
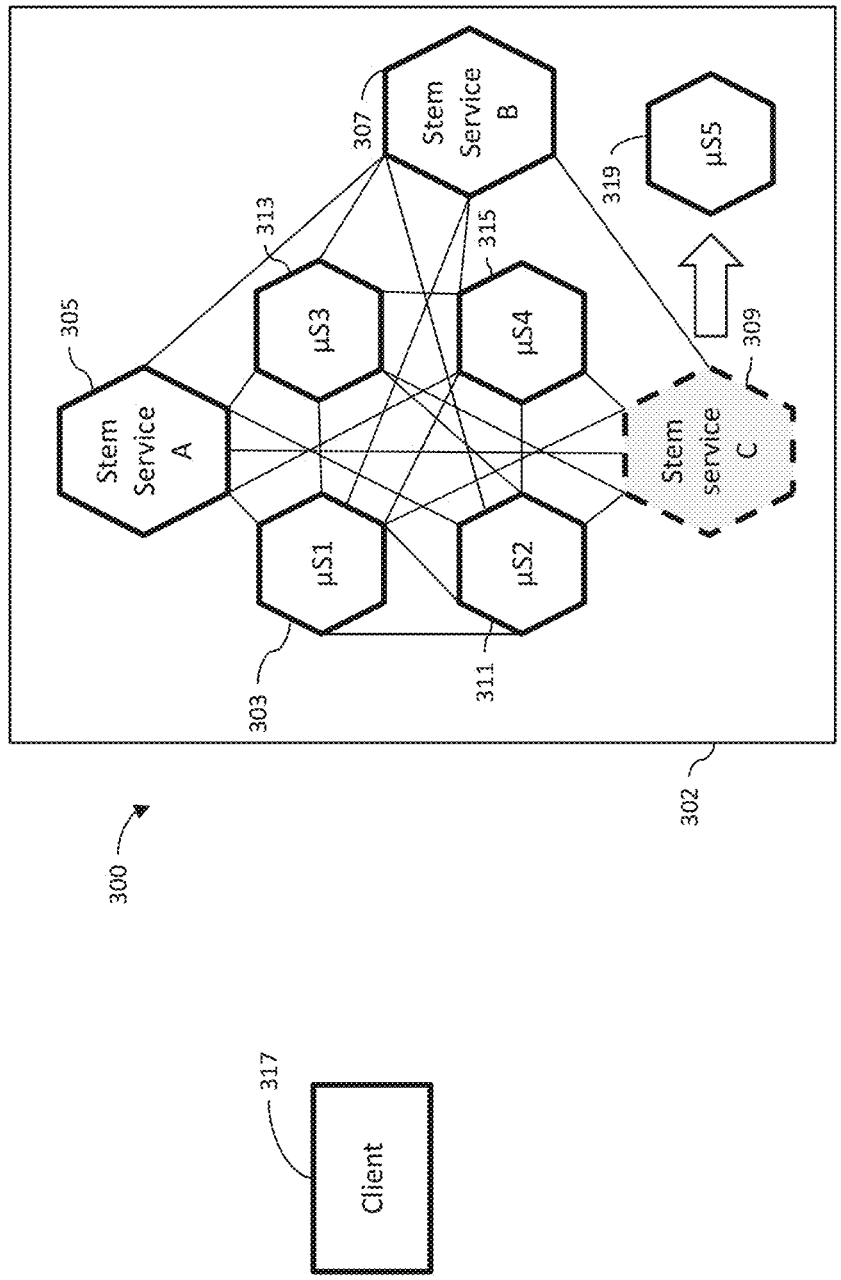
Figure 3:
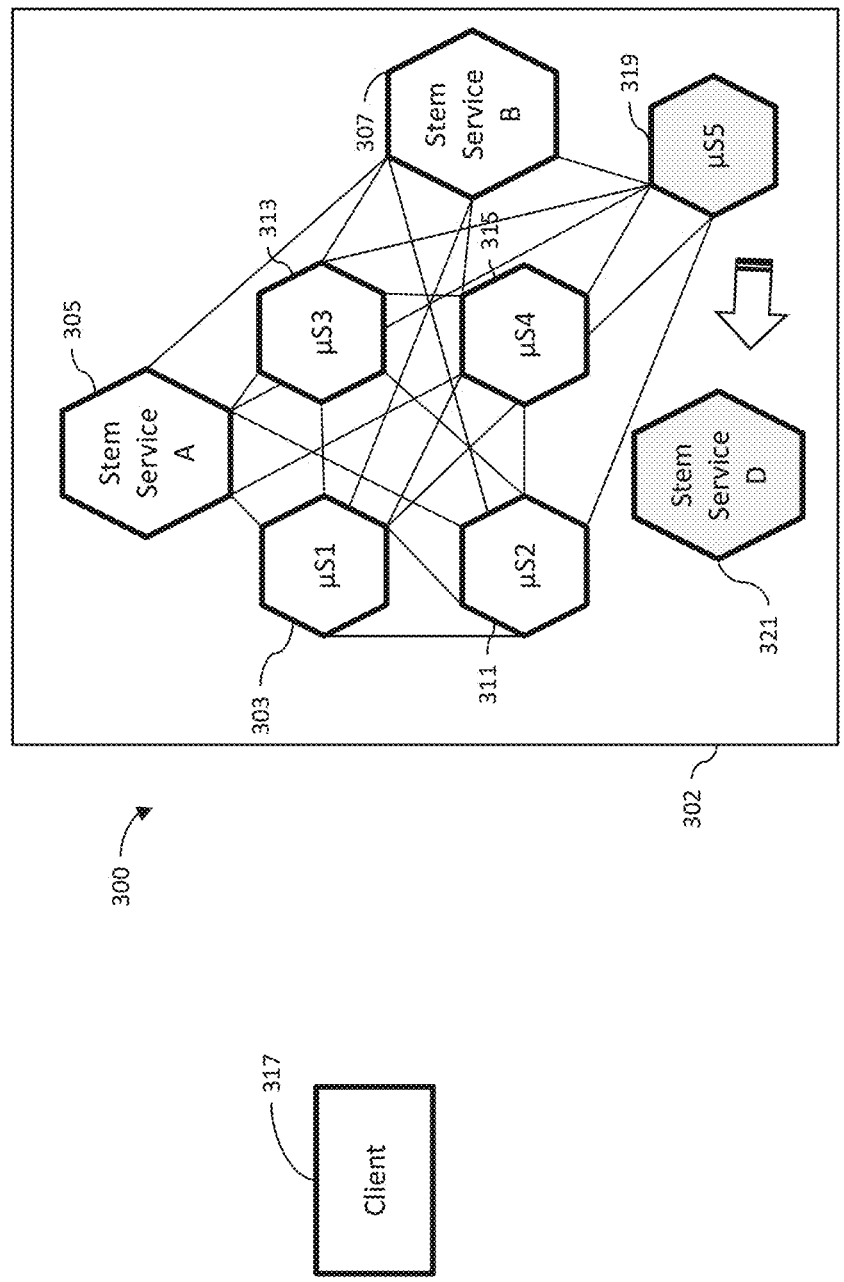

Upon receipt of the service request from the client 317, Stem Service C 309 may determine whether there is a microservice available in the colony that can process the service request. As shown in FIG. 3E if the Stem Service C 309 finds a microservice that can process the service request (e.g. μS4 315), it may send a 302 response to the client providing the address of the microservice that can process the request. The client then sends the request to μS4 315 which will service the request. The original microservice (μS2 311) is not involved in the lookup and transfer of the service request, rather that functionality is provided by the stem service.

As shown in FIG. 3F, if the Stem Service C 309 does not find a microservice that can process the service request, then it will load the appropriate rules and morph into a microservice (μS5 319) with the business logic to process the service request. As soon as that happens the directory service will be updated. Then μS5 319 will determine the number of Stem Services in the colony. If the morphing of Stem service 309 results in fewer than the minimum number of stem services then μS5 319 will spin up a Stem Service (e.g. Stem Service D 321 in FIG. 3G.). If there are too many stem services in the colony the number will be reduced by a leader selection process so that access stem services are disabled. The number of Stem Services is self-regulating. The minimum number of stem services is a system setting decided by the network operator that establishes a minimum and maximum number of stem services to operate in the colony.

Figure 4:
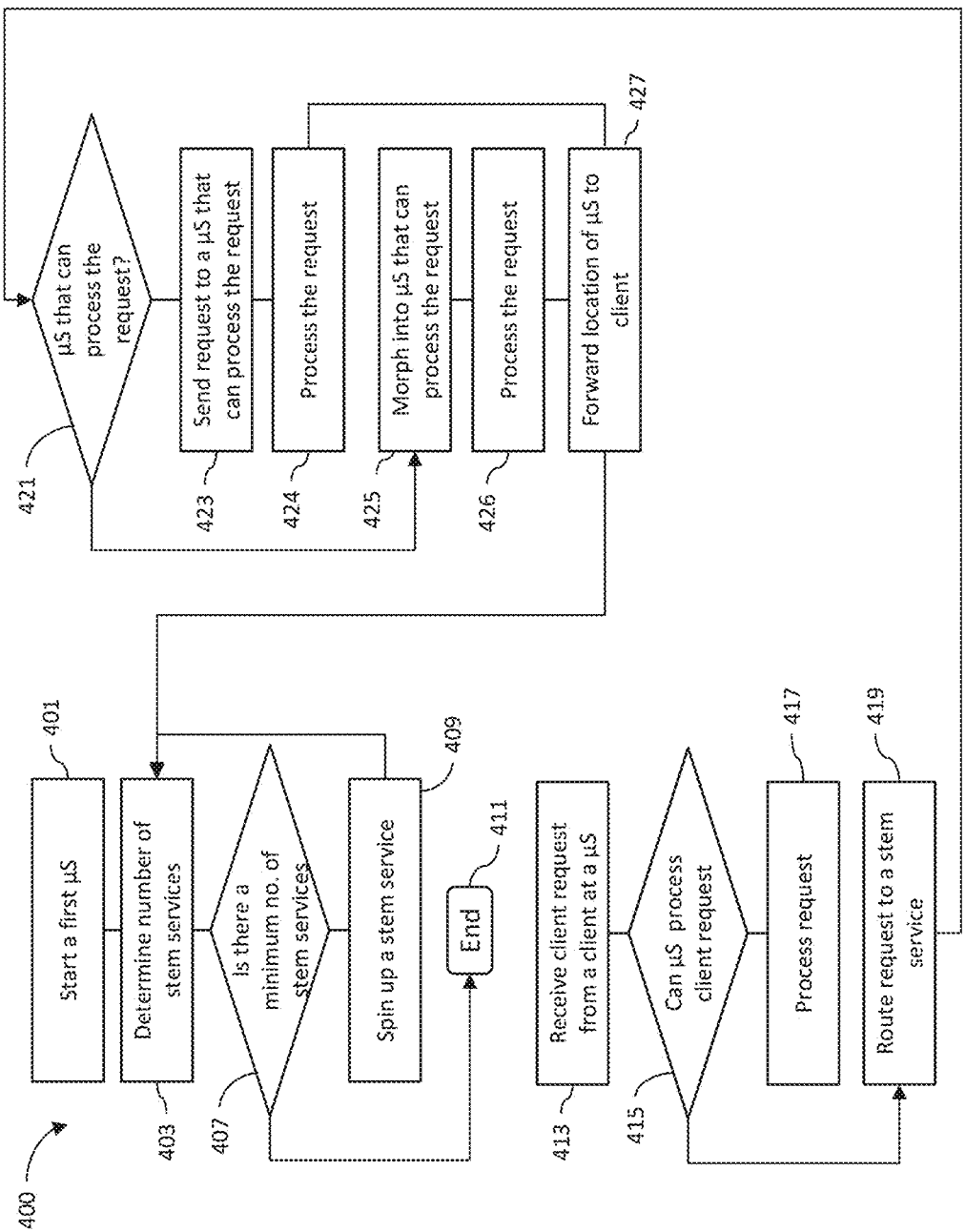
FIG. 4 is a flowchart of a method for a method for self-assembling and self-configuring microservices.

Illustrated in FIG. 4 is a flow chart of a method for self-assembling and self-configuring microservices 400.

In one example of the method 400, in step 401 a network operator starts the first microservice.

In step 403 the method 400 determines the number of stem services in the colony. In step 407, the method 400 determines if there is a minimum number of stem services available.

In step 409, in the case where only one microservice has been initiated, there will not be any stem service available in the first microservice will spin up a first stem service. The method 400 will then repeat step 403 and 407 until it is determined that the minimum number of stem services are available.

In step 413 the method 400 a service request from the client is received at a microservice. In the case where there is only the first microservice available client request will be received at the first microservice. In the case where there is a plurality of microservices available, client request will be routed to any available microservice using pseudorandom forwarding.

In step 415 the method 400 determines whether the microservice that receives the service request can process the service request. If the microservice that received the service request can process the service request then the request is processed in step 417.

If the microservice that received the service request cannot process the service request then in step 419 the microservice will forward the service request to a stem service.

In step 421 to stem service that received the service requests determines whether there exists in the colony any microservice that can process the request.

If there is a microservice in the colony that can process the request and in step 423 the request will be sent to the microservice that can process the request and will be processed by that microservice in step 424.

If there is no microservice in the colony that can process the request then in step 425 the stem service will morph into a microservice that can process the request and then process the request in step 426.

After the request has been processed the location of the microservice is forwarded to the client in step 427.

The method 900 will once again determine whether the minimum number of stem services exist in the colony and if not will spin up an additional stem service.

The behavior of the system then, according to these protocols, at startup is as follows:
 a) "any" microservice (stem or non-stem) is started; this is the "seed"; as with any biological system, you need one seed/cell to start a colony.
 b) the "seed" (as with any microservice) checks for min number of stem-service, and since there aren't any it will spin up an(another) stem-service. In a sense it will start multiplying (as an embryo)
 c) the process will continue until sufficient stem-services are running.
 d) At any point during the previous processes, a client request could hit the system, and will be routed 'randomly' to any of the running microservice (stem or non-stem).
 e) If the request lands on the wrong microservice (more than likely), it will be routed to a stem-service and then the stem-service will either route it to the correct microservice or will morph into that microservice.

Note that these are HTTP 301/302 type client redirects which means the client will automatically reroute the request and learn the location of the microservice for future requests; this way, this 'rerouting' only happens one time and thereafter only on changes (note that this is not necessary for the algorithm to work, but it makes it more efficient). The net result is that the 'colony' of μSs will dynamically replicate and around the demand (e.g., incoming requests) and therefore can more quickly shutdown unused services and focus on what is in demand "right now." This behavior also resembles biological systems by 'shedding' elements that are not in use (e.g. muscles, bone, etc.) and focus their energy on parts are in heavy use.

FIG. 5-FIG. 7B illustrate systems and methods for evolving a program (e.g., a microservice). The evolved program system may allow for a new program through a process in a way that may converge into an eventual improvement of the previous program within a reasonable probability. Further, the evolved program system may help determine the level of usefulness of the resulting new program in a way that may require no manual intervention.

Figure 5:
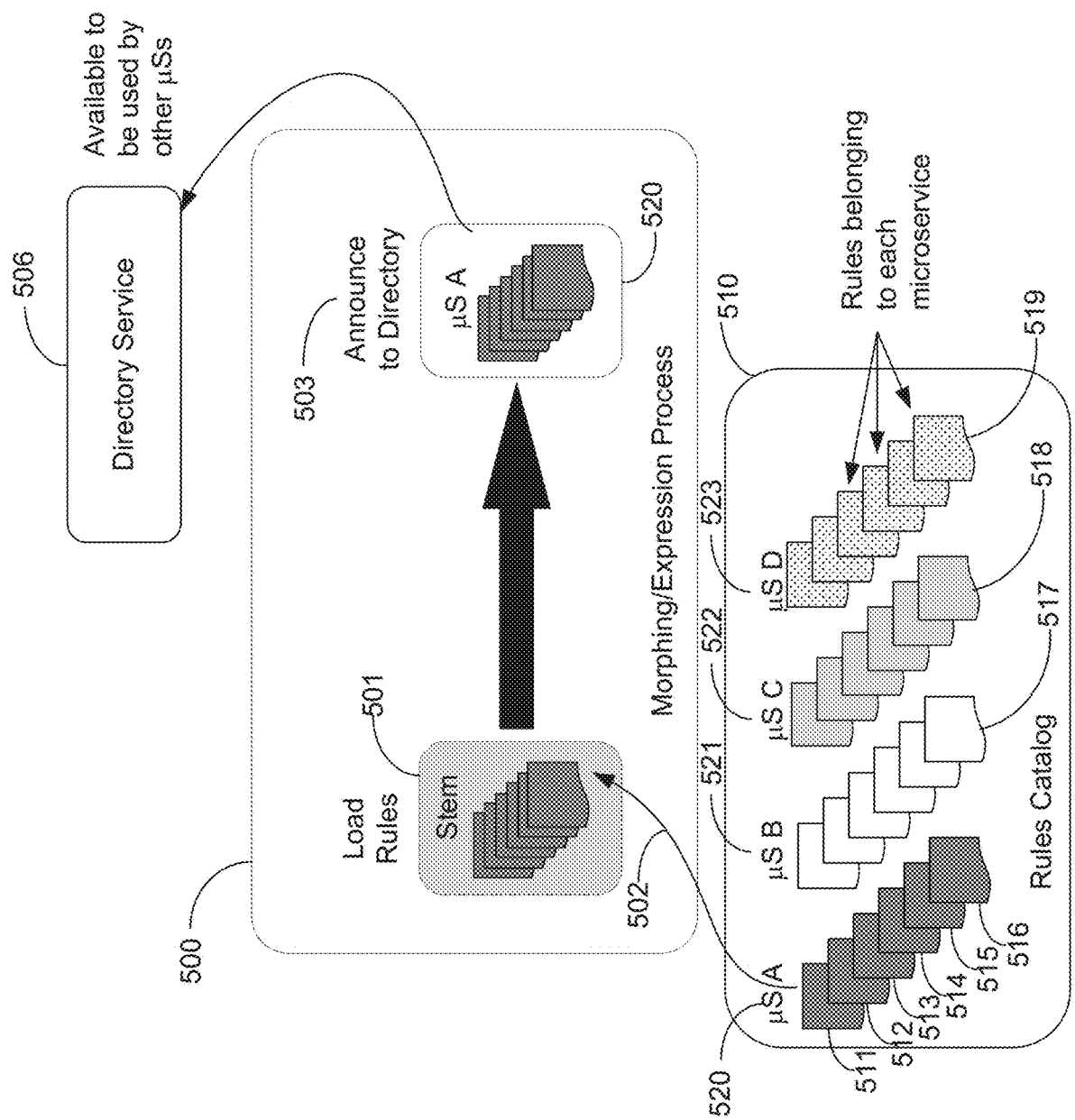
FIG. 5 illustrates an exemplary system for self-evolving microservices.

FIG. 5 illustrates an exemplary system that may be used for an evolved program. As shown in FIG. 5, there may be directory service 506, microservice 520 (μS A), or rules catalog 510, which may be located on server 105 or distributed among devices (which may be virtual or physical). The steps of morphing process 500 may occur on one device (e.g., server 105) or occur over multiple devices. Directory service 506 may track the creation or performance of microservice 520 (μS A) (e.g., at step 503). As disclosed herein, rules may be loaded into stem 501 (e.g., the entire rule set for microservice 520 in rule catalog 510) and then stem 501 may be morphed into microservice 520 (μS A). Rule catalog 510 may include multiple microservices (e.g., microservice 520 (μS A) through microservice 523 (μS D)). Microservice 520 (μS A) may include rules, such as rule 511 through rule 516. Microservice 521 (μS B), microservice 522 (μS C), and microservice 523 (μS D), may also include rules, such as rule 517, rule 518, and rule 519, respectively.

Figure 6:
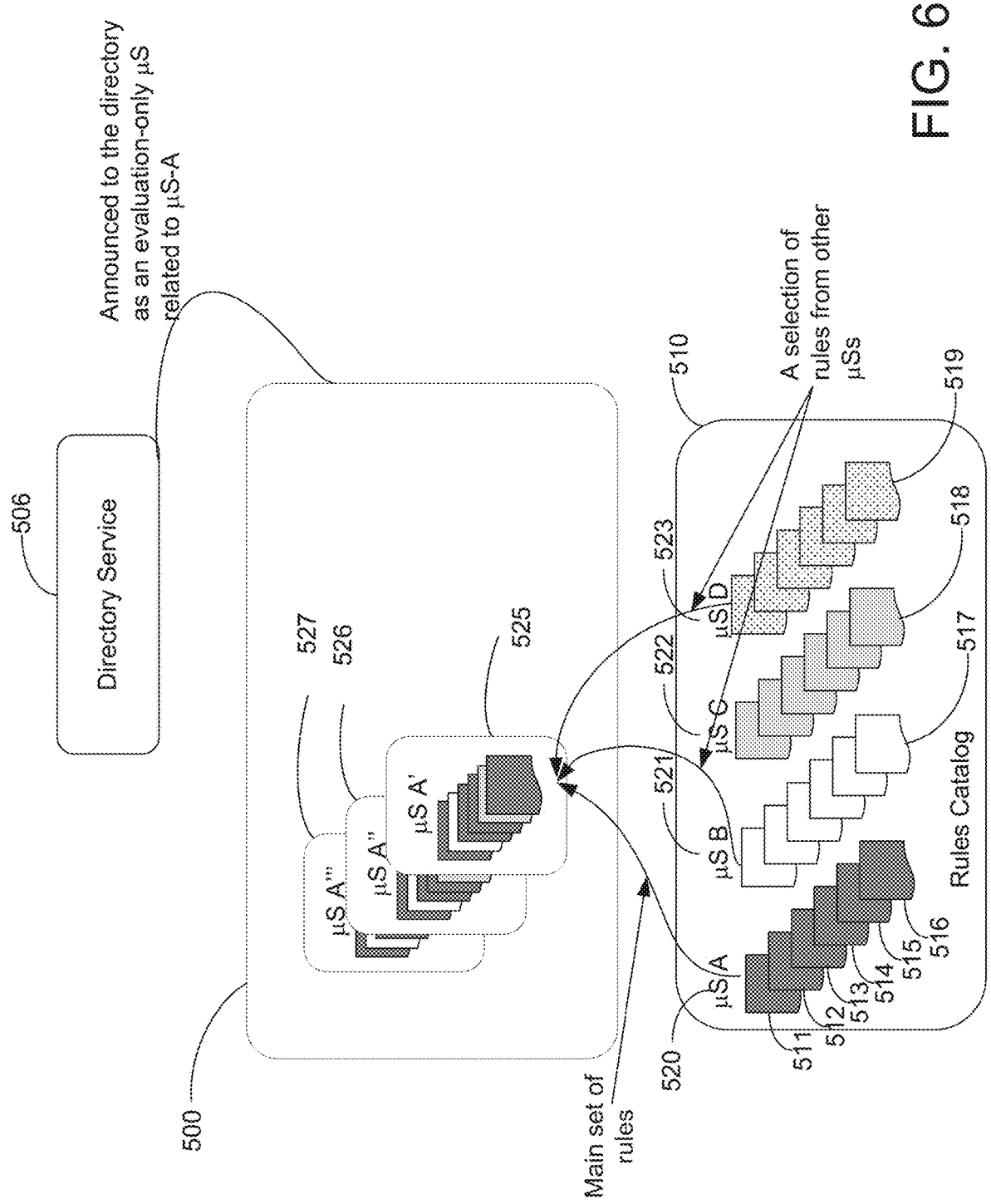
FIG. 6 illustrates an exemplary system for self-evolving microservices.

FIG. 6 illustrates an exemplary system that may be used for an evolved program. As shown in FIG. 6, the system of FIG. 5 may further include evolved microservices (e.g., evolved microservice 525 (μS A'), evolved microservice 526 (μS A"), or evolved microservice 527 (μS A'")). As provided in an example with regard to FIG. 7A, one or more rules of microservice 520 (μS A) (e.g., rule 511) may be replaced with one or more rules of microservice 521 (μS B) (e.g., rule 517). After such rule change, microservice 520 (μS A) may be become evolved microservice 525 (μS A'). It is contemplated that evolved microservice 525 (μS A') may go through an evaluation process before being generally used. It also further contemplated that microservice 525 (μS A') may be iteratively updated or evolved even while in an evaluation only state.

Figure 7A:
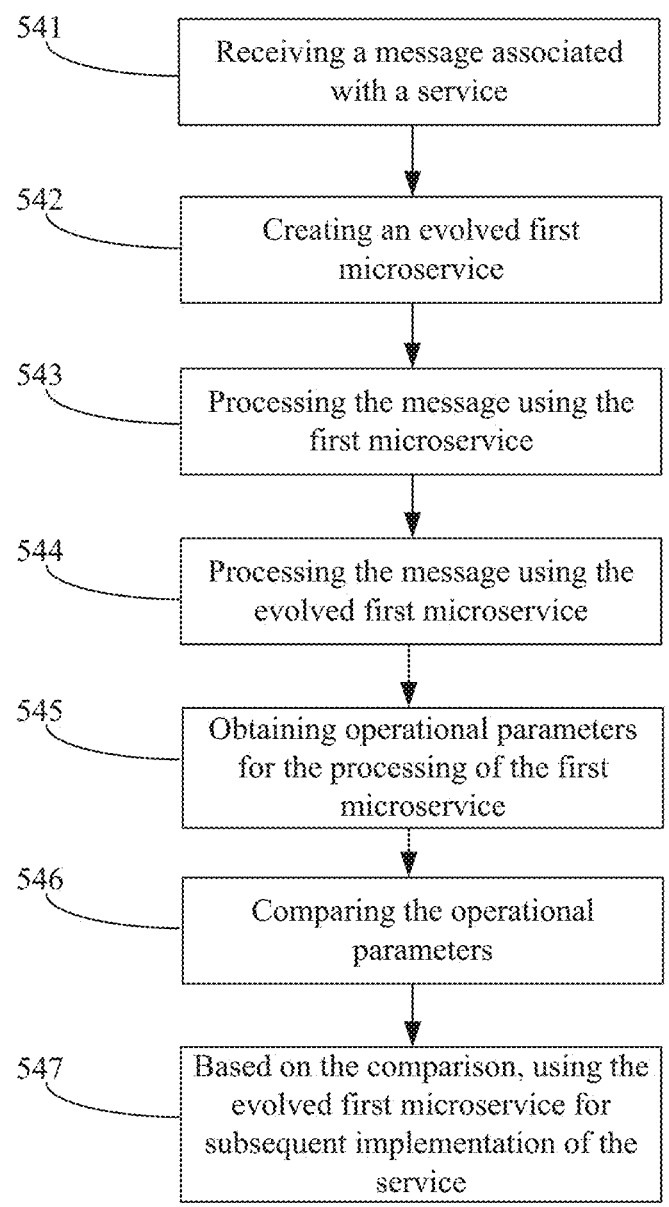
FIG. 7A illustrates an exemplary method for self-evolving microservices.

FIG. 7A illustrates an exemplary method for an evolved program. At step 541, a message associated with a service may be received. For example, a message may be a request to implement a service or obtain a result associated with the service. The message may be sent to microservice 520 (μS A) in order to generate one or more results for implementation of the service. Microservice 520 (μS A) may be used by other microservices. As disclosed herein, microservice 520 (μS A) may include a plurality of rules, such as rule 511 through rule 516. At step 542, subsequent to receiving the message of step 541, microservice 525 (μS A') may be created. In an example, microservice 525 (μS A') may be created by creating a copy of microservice 520 (μS A) and then replacing one or more of the rules of microservice 520 (μS A) with another rule(s) (e.g., rule 516 is replaced with rule 517). The creation (or use) of microservice 525 (μS A') may be based on any number of triggers. The triggers may include a period of time, operational parameters (e.g., performance indicators), number of messages sent or received by microservice 520 (μS A), type of device used, type of virtual network function used, or number of microservice 520 (μS A) available for operation, among other things.

At step 543, microservice 520 (μS A) may process the message of step 541 and obtain a result that is used for the service. Here microservice 520 (μS A) may be considered active and used in the normal course of operation of the service (e.g., actively contributes to the implementation of the service). At step 544, microservice 525 (μS A') may process the message of step 541 and obtain a result. As shown in FIG. 7B, there may be other microservices (e.g., microservice 526 (μS A") and microservice 527 (μS A'")) that may also process the message of step 541. At this step 544, microservice 525 (μS A') and the other microservices may be marked to be in an evaluation state (marked with dotted line 532, 533, and 534). In this evaluation state, microservice 525 (μS A') may not be directly accessible to other microservices or its results may not be used during the normal course of operation of the service.

At step 545, information may be gathered regarding the performance indicators or other operational parameters of microservice 520 (μS A) and microservice 525 (μS A'). The performance indicators may include or be based on central processing unit (CPU) utilization, memory usage, type of device used, number of outages, type of virtual network function used, bandwidth usage, speed in processing a message to obtain result, result precision, or result accuracy, among other things. At step 546, the operational parameters of microservice 520 (μS A) and microservice 525 (μS A') may be compared to determine which microservice provides for an enhanced performance (e.g., a performance level at a certain threshold). Operational parameters may be weighted differently when determining performance. The performance may be based on an average of operational parameters, operational parameters at a certain time, or the like.

At step 547, based on the comparing of step 546, there may be a determination of whether to use microservice 520 (μS A) or microservice 525 (μS A'). For example, if the performance reaches a threshold X, then microservice 520 (μS A) may be replaced with microservice 520 (μS A'). It is contemplated that the evolved program may just replace a certain subset of messages used in the original program. For example, microservice 520 (μS A) may be initially used for message types A-Z, but now microservice 520 (μS A) may remain with message types A-W and microservice 525 (μS A') may be used for message types X-Z. It is further contemplated that the evaluation process may be used to remove evolved programs (e.g., microservice 527 (μS A'")) that have not been placed into the normal course of operation.

Directory service 506 may be used to keep track of the implemented microservices and the microservices in an evaluation state. For each N-number of μS A produced by the systems, a limited number of evaluation-marked microservices copies (e.g., any number of A' or A", etc.) may also be produced. As disclosed herein, the evaluation marked copies may not be put in general use and may be identified as "evaluation only" or "limited use" copies. All or some of the evaluation-marked microservices copies may receive a copy of the messages sent to the implemented microservice. Further, on a periodic basis, a subset of one or more evaluation marked microservice copies may be selected (e.g., randomly selected, selected in an order, or systematically selected). Averages or specific times of a transactions may be used in evaluating the performance of the microservices.

The evolved program may be slowly introduced into the infrastructure. This introduction may be done by copying the particular revision of rulesets into the catalog as an alternative and then phasing it in over a periodic time, which may be based on triggers disclosed herein. The above (e.g., description associated with FIG. 5-FIG. 7B) may be designed to produce an evolved version of the "same" function (e.g., match the base functionality of the current version). This may prevent programs from evolving out of control.

Terms used herein are further described below.

Algorithm. a process or set of rules to be followed in calculations or other problem-solving operations, API. a set of functions and procedures allowing the creation of applications that access the features or data of an operating system, application, or other service.

Base code. (e.g., boiler plate code, infrastructure code, etc.)

Colony of Microservices.

Container. A container is a standard unit of software that packages up code and all its dependencies so the application runs quickly and reliably from one computing environment to another.

Directory Service. Service that tracks location of microservices.

Docker is a platform and tool for building, distributing, and running Docker containers.

Docker Containers. Docker containers are Containers that run on Docker Engine. Docker containers are standard and portable. They are lightweight because they share the machine's operating system kernel and therefore do not require an operating system for application. Docker containers are also secure.

HAProxies. HAProxies provides high availability load balancer and proxy server for TCP and HTTP-based applications that spreads requests across multiple servers. It is written in C and has a reputation for being fast and efficient (in terms of processor and memory usage).

Host resource service. Service that starts a new microservice when needed.

HTTP 301/302 code. A 301 redirect means that an address has permanently moved to a new location. A 302 redirect means that the move is only temporary.

Infrastructure Services. Directory service and Host resources services.

"Kubernetes" are container orchestration systems for Docker containers that are meant to coordinate clusters of nodes at scale in production in an efficient manner.

"Leader election." Leader election is the process of designating a single process as the organizer of some task distributed among several computers (nodes). Before the task is begun, all network nodes are either unaware which node will serve as the "leader" (or coordinator) of the task, or unable to communicate with the current coordinator. After a leader election algorithm has been run, however, each node throughout the network recognizes a particular, unique node as the task leader.

"Load Balancing." Load balancing is the process of distributing network traffic across multiple servers. This ensures no single server bears too much demand. By spreading the work evenly, load balancing improves application responsiveness. It also increases availability of applications and websites for users.

Microservices. A microservice is an architectural design that separates portions of a (usually monolithic) application into small, self-containing services. The key idea in microservice architecture is to create small (really small) services, develop and deploy them independently. Each microservice uses its own database and could be written in any programming language. In short, the microservice architectural style is an approach to developing a single application as a suite of small services, each running in its own process and communicating with lightweight mechanisms, often an HTTP resource API. These services are built around business capabilities and independently deployable by fully automated deployment machinery. There is a bare minimum of centralized management of these services, which may be written in different programming languages and use different data storage technologies.

Microservices are built around business capabilities, communicating through lightweight interfaces (REST JSON style requests, in general there is no need for an Enterprise Service Bus or complex XML SOAP envelopes), and having a decentralized control of data where each service manages its own data. Microservices provide flexible scaling. Microservices allow each service to be independently scaled to meet demand for the application feature it supports. This enables teams to right-size infrastructure needs, accurately measure the cost of a feature, and maintain availability if a service experiences a spike in demand. Microservices provide for easy deployment. Microservices enable continuous integration and continuous delivery, making it easy to try out new ideas and to roll back if something doesn't work. The low cost of failure enables experimentation, makes it easier to update code, and accelerates time-to-market for new features. Microservices architectures do not follow a "one size fits all" approach. Teams have the freedom to choose the best tool to solve their specific problems. As a consequence, teams building microservices can choose the best tool for each job. Dividing software into compact modules enables programmers to reuse the code for multiple purposes. A service written for a certain function can be used as a template for another feature. Unlike a monolithic architecture, where the failure of a single component can cause the whole application to fail, microservices failure result in the degradation of functionality and not the crash of the application.

Morphing. The act of a stem service being expressed as a specific microservice. The morphing (or "expression" in biological terms) is accomplished by the stem-service loading rules of the new microservice (the system is primarily rule-based, so loading new rules change the behavior of the service).

"Microservice Proxy". Microservice Proxy is a microservice that know how to load, shutdown, and route to the non-compliant microservice; so, in the case of a stem-service morphing (expressing) into a non-compliant microservice, it will just load the proxy's rules and those rules will instantiate the non-compliant microservice and route traffic to it.

Network protocols. are sets of established rules that dictate how to format, transmit and receive data so computer network devices—from servers and routers to endpoints—can communicate regardless of the differences in their underlying infrastructures, designs or standards.

Non-Compliant Services. Services that do not follow the rules of the regular self-assembling/self-configuring microservice.

Proxy. In computer networks, a proxy acts as an intermediary for requests from clients to servers for resources. An outbound proxy provides both security isolation and performance optimization for network traffic. Internal clients protected by a firewall do not have direct access out to the Internet. Instead, clients send all requests to a proxy that does have external access that then makes the requests on behalf of the original client. The proxy can optionally cache content locally optimizing the use of network bandwidth and providing faster responses to clients.

Pseudo-random number generator. A pseudorandom number generator (PRNG), also known as a deterministic random bit generator (DRBG), [1] is an algorithm for generating a sequence of numbers whose properties approximate the properties of sequences of random numbers. The PRNG-generated sequence is not truly random, because it is completely determined by an initial value, called the PRNG's seed (which may include truly random values). Although sequences that are closer to truly random can be generated using hardware random number generators, pseudorandom number generators are important in practice for their speed in number generation and their reproducibility.

Pseudo Random Routing. As used herein pseudo-random routing means that the incoming gateway tries to route the request properly, but if it doesn't and routes it to the wrong microservice, the (wrong) microservice will still take the request and route it to its proper destination. In some cases, the gateway might know about some destinations (based on caching) and will route the requests to them directly, but if it doesn't know the destination, then it will pick a random microservice and will route the request to it and let the microservice handle it. In the latter case, a pseudo-random number generator is used to identify the target microservice so as to avoid sending all the unknowns to one instance (in this case it will be the port number that is randomly generated, plus potentially an index of a host in a list of available hosts).

Rule Engine. A rule engine, which is a set of tools that enable business analysts and developers to build decision logic based on an organization's data. The rule engine applies rules and actions as defined by end users without affecting how the application runs.

"Service." A service is a self-contained unit of software that performs a specific task.

"Service Protocols." Service protocols deal with identifying which service is needed to display the contents of each packet.

"Spin up." Spin up means to create an instance (of say a microservice).

"Stem Services." Stem Services are microservices that can morph into any other microservice (e.g. behave similar to a stem cell in a biological analogy).

Virtual Directory Services. A virtual entity realized through a distributed protocol to exchange directory services among each microservice (e.g. so each has view of the entire directory).

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed examples may be embodied in various and alternative forms, and combinations thereof. As used herein, for example, "exemplary," and similar terms, refer expansively as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

All variations, modifications, and combinations are included herein by the scope of this disclosure and the following claims.

Figure 8:
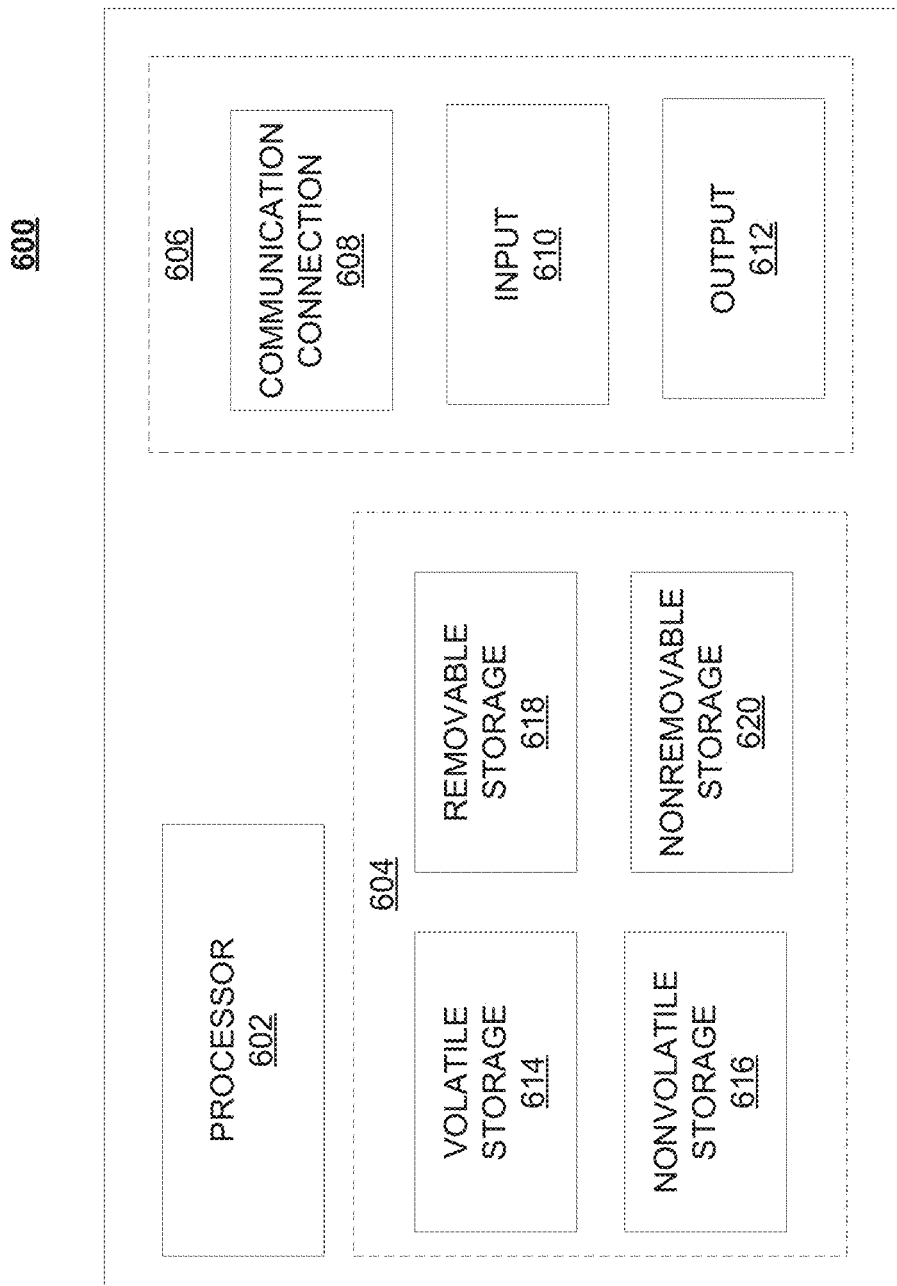
FIG. 8 illustrates a schematic of an exemplary network device.

FIG. 8 is a block diagram of network device 600 that may be connected to or comprise a component of FIG. 1-FIG. 6. Network device 600 may comprise hardware or a combination of hardware and software. The functionality to facilitate telecommunications via a telecommunications network may reside in one or combination of network devices 600. Network device 600 depicted in FIG. 8 may represent or perform functionality of an appropriate network device 600, or combination of network devices 600, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with mapping wireless signal strength.

In addition to processor 602 and memory 604, network device 600 may include an input/output system 606. Processor 602, memory 604, and input/output system 606 may be coupled together (coupling not shown in FIG. 8) to allow communications between them. Each portion of network device 600 may comprise circuitry for performing functions associated with each respective portion. Thus, each portion may comprise hardware, or a combination of hardware and software. Input/output system 606 may be capable of receiving or providing information from or to a communications device or other network entities configured for telecommunications. For example, input/output system 606 may include a wireless communications (e.g., 3G/4G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to map signal strengths in an area of interest.

Figure 9:
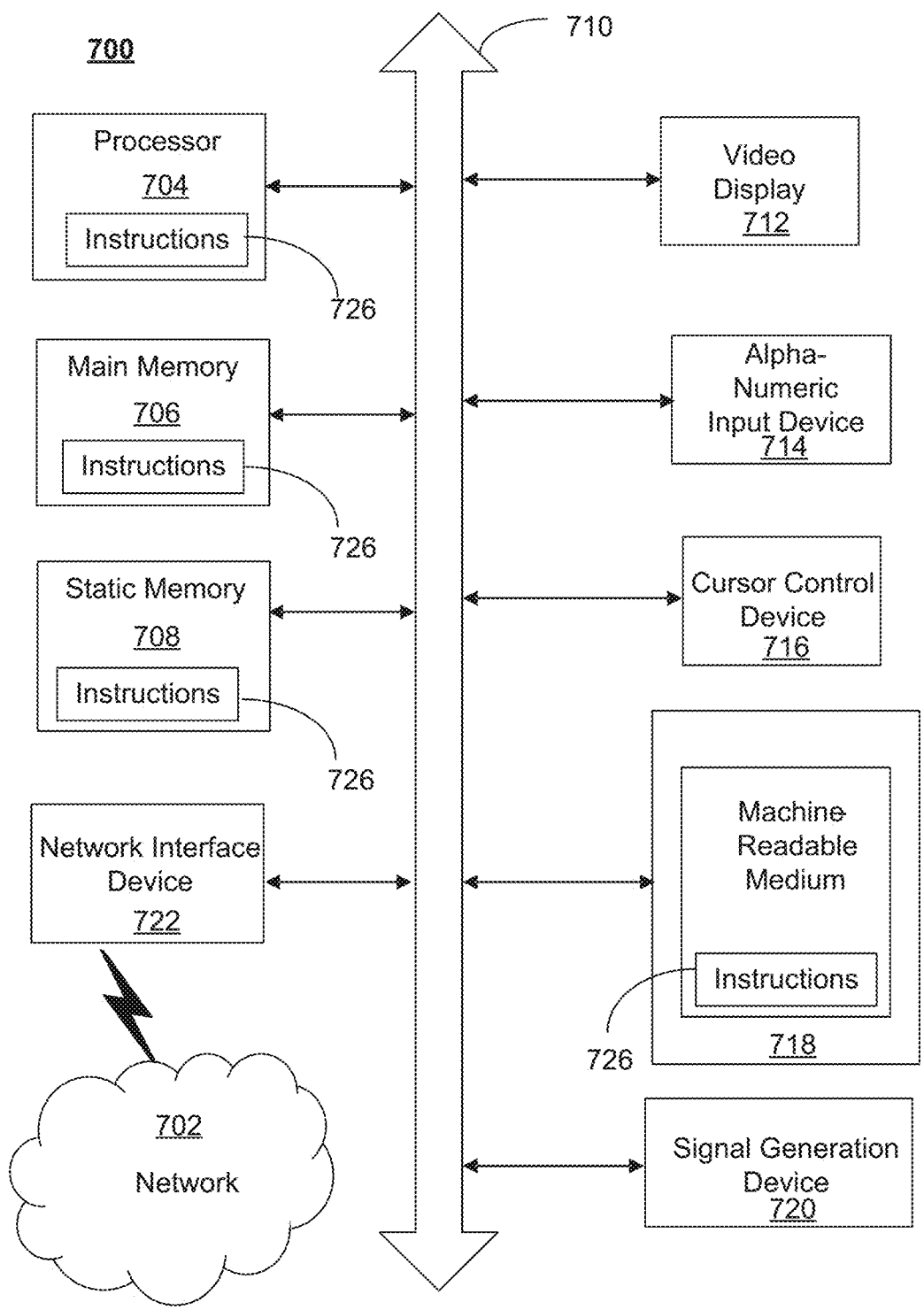
FIG. 9 illustrates an exemplary communication system that provides wireless telecommunication services over wireless communication networks.

FIG. 9 depicts an exemplary diagrammatic representation of a machine in the form of a computer system 700 within which a set of instructions, when executed, may cause the machine to perform any one or more of the methods described above. One or more instances of the machine can operate, for example, as processor 602, server 105, data stores 109, and other devices herein. In some examples, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the examples described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium on which is stored one or more sets of instructions (e.g., software 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

Figure 10A:
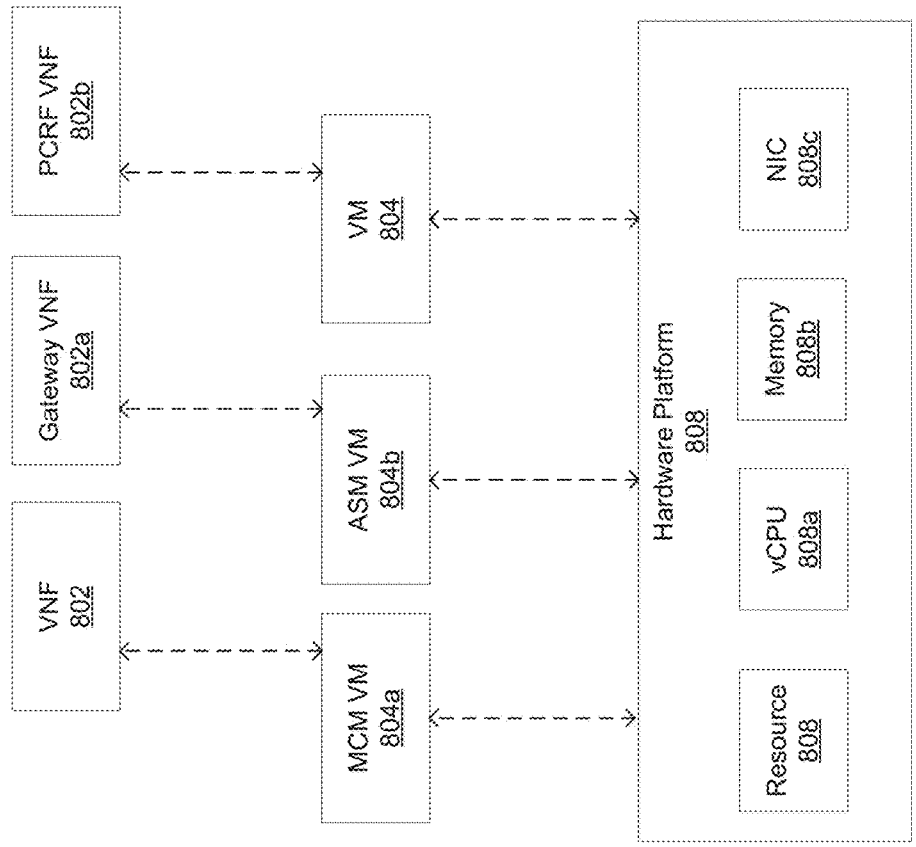
FIG. 10A is a representation of an exemplary network.

FIG. 10A is a representation of an exemplary network 800. Network 800 (e.g., FIG. 1) may include an SDN. For example, network 800 may include one or more virtualized functions implemented on general purpose hardware, such as in lieu of having dedicated hardware for every network function. That is, general purpose hardware of network 800 may be configured to run virtual network elements to support communication services, such as mobility services, including consumer services and enterprise services. These services may be provided or measured in sessions.

A virtual network functions (VNFs) 802 may be able to support a limited number of sessions. Each VNF 802 may have a VNF type that indicates its functionality or role. For example, FIG. 10A illustrates a gateway VNF 802a and a policy and charging rules function (PCRF) VNF 802b. Additionally or alternatively, VNFs 802 may include other types of VNFs. Each VNF 802 may use one or more virtual machines (VMs) 804 to operate. Each VM 804 may have a VM type that indicates its functionality or role. For example, FIG. 10A illustrates a management control module (MCM) VM 804a and an advanced services module (ASM) VM 804b. Additionally or alternatively, VMs 804 may include other types of VMs, such as a DEP VM (not shown). Each VM 804 may consume various network resources from a hardware platform 806, such as a resource 808, a virtual central processing unit (vCPU) 808a, memory 808b, or a network interface card (NIC) 808c. Additionally or alternatively, hardware platform 806 may include other types of resources 808.

Figure 10B:
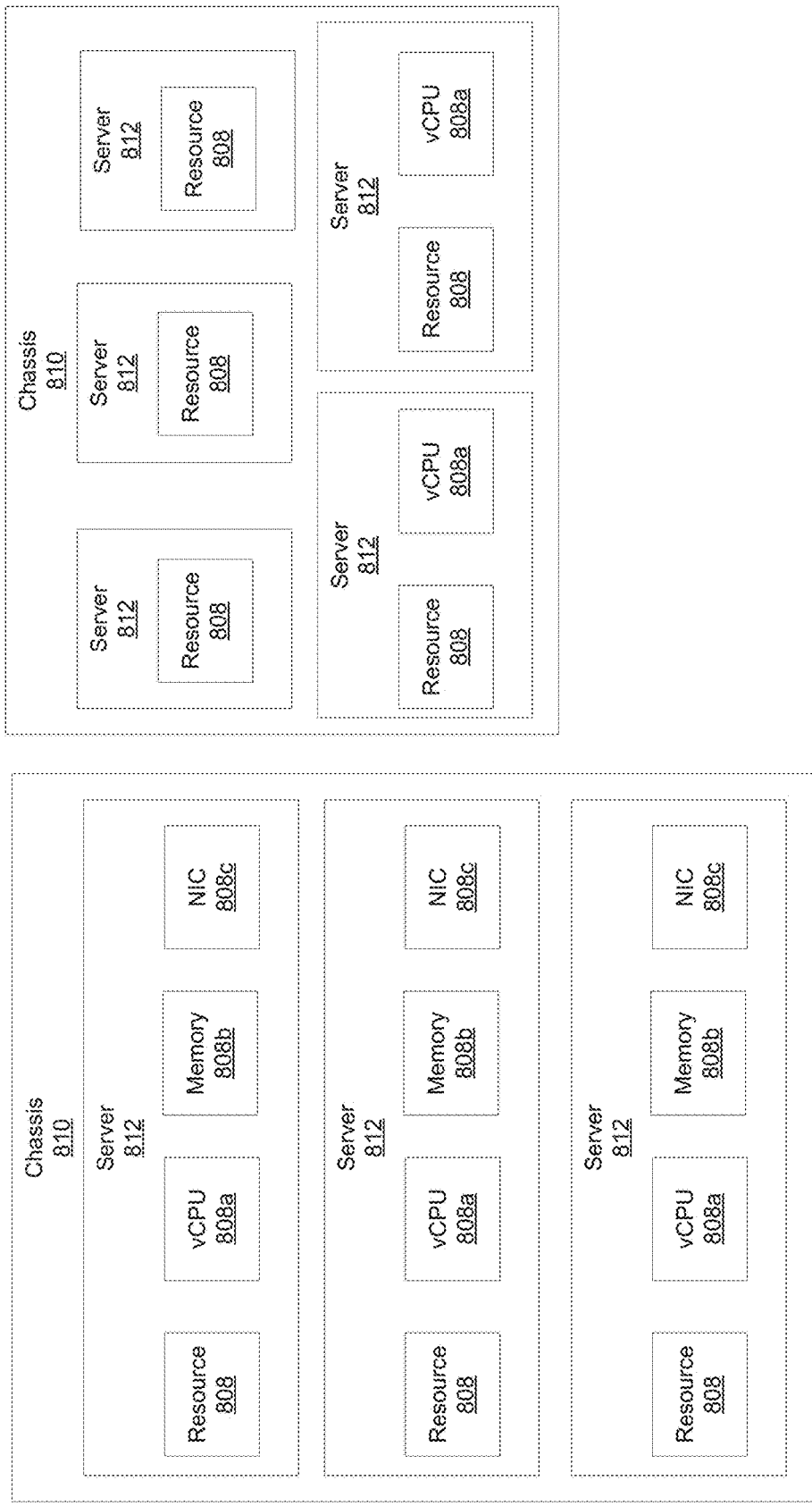
FIG. 10B is a representation of an exemplary hardware platform for a network.

While FIG. 10A illustrates resources 808 as collectively contained in hardware platform 806, the configuration of hardware platform 806 may isolate, for example, certain memory 808c from other memory 808c. FIG. 10B provides an exemplary implementation of hardware platform 806.

Hardware platform 806 may comprise one or more chassis 810. Chassis 810 may refer to the physical housing or platform for multiple servers or other network equipment. In an aspect, chassis 810 may also refer to the underlying network equipment. Chassis 810 may include one or more servers 812. Server 812 may comprise general purpose computer hardware or a computer. In an aspect, chassis 810 may comprise a metal rack, and servers 812 of chassis 810 may comprise blade servers that are physically mounted in or on chassis 810.

Each server 812 may include one or more network resources 808, as illustrated. Servers 812 may be communicatively coupled together (not shown) in any combination or arrangement. For example, all servers 812 within a given chassis 810 may be communicatively coupled. As another example, servers 812 in different chassis 810 may be communicatively coupled. Additionally or alternatively, chassis 810 may be communicatively coupled together (not shown) in any combination or arrangement.

The characteristics of each chassis 810 and each server 812 may differ. For example, FIG. 10B illustrates that the number of servers 812 within two chassis 810 may vary. Additionally or alternatively, the type or number of resources 810 within each server 812 may vary. In an aspect, chassis 810 may be used to group servers 812 with the same resource characteristics. In another aspect, servers 812 within the same chassis 810 may have different resource characteristics.

Given hardware platform 806, the number of sessions that may be instantiated may vary depending upon how efficiently resources 808 are assigned to different VMs 804. For example, assignment of VMs 804 to particular resources 808 may be constrained by one or more rules. For example, a first rule may require that resources 808 assigned to a particular VM 804 be on the same server 812 or set of servers 812. For example, if VM 804 uses eight vCPUs 808a, 1 GB of memory 808b, and 2 NICs 808c, the rules may require that all of these resources 808 be sourced from the same server 812. Additionally or alternatively, VM 804 may require splitting resources 808 among multiple servers 812, but such splitting may need to conform with certain restrictions. For example, resources 808 for VM 804 may be able to be split between two servers 812. Default rules may apply. For example, a default rule may require that all resources 808 for a given VM 804 must come from the same server 812.

An affinity rule may restrict assignment of resources 808 for a particular VM 804 (or a particular type of VM 804). For example, an affinity rule may require that certain VMs 804 be instantiated on (that is, consume resources from) the same server 812 or chassis 810. For example, if VNF 802 uses six MCM VMs 804a, an affinity rule may dictate that those six MCM VMs 804a be instantiated on the same server 812 (or chassis 810). As another example, if VNF 802 uses MCM VMs 804a, ASM VMs 804b, and a third type of VMs 804, an affinity rule may dictate that at least the MCM VMs 804a and the ASM VMs 804b be instantiated on the same server 812 (or chassis 810). Affinity rules may restrict assignment of resources 808 based on the identity or type of resource 808, VNF 802, VM 804, chassis 810, server 812, or any combination thereof.

An anti-affinity rule may restrict assignment of resources 808 for a particular VM 804 (or a particular type of VM 804). In contrast to an affinity rule—which may require that certain VMs 804 be instantiated on the same server 812 or chassis 810—an anti-affinity rule requires that certain VMs 804 be instantiated on different servers 812 (or different chassis 810). For example, an anti-affinity rule may require that MCM VM 804a be instantiated on a particular server 812 that does not contain any ASM VMs 804b. As another example, an anti-affinity rule may require that MCM VMs 804a for a first VNF 802 be instantiated on a different server 812 (or chassis 810) than MCM VMs 804a for a second VNF 802. Anti-affinity rules may restrict assignment of resources 808 based on the identity or type of resource 808, VNF 802, VM 804, chassis 810, server 812, or any combination thereof.

Within these constraints, resources 808 of hardware platform 806 may be assigned to be used to instantiate VMs 804, which in turn may be used to instantiate VNFs 802, which in turn may be used to establish sessions. The different combinations for how such resources 808 may be assigned may vary in complexity and efficiency. For example, different assignments may have different limits of the number of sessions that can be established given a particular hardware platform 806.

For example, consider a session that may require gateway VNF 802a and PCRF VNF 802b. Gateway VNF 802a may require five VMs 804 instantiated on the same server 812, and PCRF VNF 802b may require two VMs 804 instantiated on the same server 812. (Assume, for this example, that no affinity or anti-affinity rules restrict whether VMs 804 for PCRF VNF 802b may or must be instantiated on the same or different server 812 than VMs 804 for gateway VNF 802a.) In this example, each of two servers 812 may have enough resources 808 to support 10 VMs 804. To implement sessions using these two servers 812, first server 812 may be instantiated with 10 VMs 804 to support two instantiations of gateway VNF 802a, and second server 812 may be instantiated with 9 VMs: five VMs 804 to support one instantiation of gateway VNF 802a and four VMs 804 to support two instantiations of PCRF VNF 802b. This may leave the remaining resources 808 that could have supported the tenth VM 804 on second server 812 unused (and unusable for an instantiation of either a gateway VNF 802a or a PCRF VNF 802b). Alternatively, first server 812 may be instantiated with 10 VMs 804 for two instantiations of gateway VNF 802a and second server 812 may be instantiated with 10 VMs 804 for five instantiations of PCRF VNF 802b, using all available resources 808 to maximize the number of VMs 804 instantiated.

Consider, further, how many sessions each gateway VNF 802a and each PCRF VNF 802b may support. This may factor into which assignment of resources 808 is more efficient. For example, consider if each gateway VNF 802a supports two million sessions, and if each PCRF VNF 802b supports three million sessions. For the first configuration—three total gateway VNFs 802a (which satisfy the gateway requirement for six million sessions) and two total PCRF VNFs 802b (which satisfy the PCRF requirement for six million sessions)—would support a total of six million sessions. For the second configuration—two total gateway VNFs 802a (which satisfy the gateway requirement for four million sessions) and five total PCRF VNFs 802b (which satisfy the PCRF requirement for 15 million sessions)—would support a total of four million sessions. Thus, while the first configuration may seem less efficient looking only at the number of available resources 808 used (as resources 808 for the tenth possible VM 804 are unused), the second configuration is actually more efficient from the perspective of being the configuration that can support more the greater number of sessions.

To solve the problem of determining a capacity (or, number of sessions) that can be supported by a given hardware platform 805, a given requirement for VNFs 802 to support a session, a capacity for the number of sessions each VNF 802 (e.g., of a certain type) can support, a given requirement for VMs 804 for each VNF 802 (e.g., of a certain type), a give requirement for resources 808 to support each VM 804 (e.g., of a certain type), rules dictating the assignment of resources 808 to one or more VMs 804 (e.g., affinity and anti-affinity rules), the chassis 810 and servers 812 of hardware platform 806, and the individual resources 808 of each chassis 810 or server 812 (e.g., of a certain type), an integer programming problem may be formulated.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which message for self-assembling, self-evolving, or self-configuring microservices nay be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (e.g., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—self-assembling, self-evolving, or self-configuring microservices—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing or operating self-evolving microservices. A method, system, computer readable storage medium, or apparatus may provide for receiving a message associated with a service, wherein the message is for a first microservice that contributes to the implementation of the service (e.g., generating results that contribute to the implementation), wherein the first microservice comprises a plurality of rules; and subsequent to receiving the message, creating an evolved first microservice, wherein the creating of the evolved first microservice comprises: obtaining the plurality of rules of the first microservice; and replacing a first rule of the plurality of rules of the first microservice with a second rule of a plurality of rules of a second microservice. The method, system, computer readable storage medium, or apparatus may provide for processing the message using the first microservice to obtain a first result of the results, wherein the first result contributes to the implementation of the service; processing the message using the evolved first microservice to obtain an evolved result, wherein the evolved result is used for evaluation of a potential implementation of the service; obtaining operational parameters for the processing of the first microservice; obtaining operational parameters for the processing of the evolved first microservice; comparing the operational parameters for the processing of the first microservice with the operational parameters for the processing of the evolved first microservice; and based on the comparing of the operational parameters for the processing of the first microservice with the operational parameters for the processing of the evolved first microservice, using the evolved first microservice for subsequent implementation of the service. An implementation may be a potential implementation when it is marked as evaluation only or the like. In an example, the evolved first microservice may be marked as primary or the like instead of evaluation only. The second rule or the second microservice may be systematically or randomly selected. The creating of the evolved first microservice may be triggered based on a period or another operational parameter. The message may be of a first type of a plurality of types that use the first microservice. The message may be a first type of a plurality of types that use the first microservice. The using of the evolved first microservice for implementation of the service may be for subsequent messages of a second type of the plurality of types. The method, system, computer readable storage medium, or apparatus may provide for obtaining a list of a plurality of evolved microservices, wherein the plurality of evolved microservices comprises the evolved first microservice. The creating of the evolved first microservice may include loading a plurality of rules into a stem service. The method, system, computer readable storage medium, or apparatus may provide for indicating in a directory whether the first microservice and the evolved first microservice is an evolved microservice. The method, system, computer readable storage medium, or apparatus may provide for indicating in a directory whether the first microservice and the evolved first microservice is an evaluation microservice (e.g., generally not in use) or an implemented microservice (e.g., generally in use). Although the term microservices is used it is contemplated that the disclosed methods may be used for other regular programs. The creating the evolved first microservice may be triggered based on an operational parameter (e.g., operational parameter(s) reaching a threshold) or receiving the message. A method, system, computer readable storage medium, or apparatus may provide for receiving a message associated with a service, wherein the message is for a first microservice that contributes to the implementation of the service; and subsequent to receiving the message, creating an evolved first microservice using a second rule of a plurality of rules of a second microservice. All combinations in this paragraph (including the removal or addition of steps) are contemplated in a manner that is consistent with the other portions of the detailed description.

What is claimed:

1. A system comprising:
one or more processors; and
memory coupled with the one or more processors, the memory storing executable instructions that when executed by the one or more processors cause the one or more processors to effectuate operations comprising:
receiving a message associated with a service, wherein the message is for a first microservice that contributes to implementation of the service, wherein the first microservice comprises a plurality of rules;
subsequent to receiving the message, creating an evolved first microservice, wherein the creating of the evolved first microservice comprises replacing a first rule of the plurality of rules of the first microservice with a second rule of a plurality of rules of a second microservice;
processing the message using the first microservice to obtain a first result, wherein the first result contributes to the implementation of the service;
processing the message using the evolved first microservice to obtain an evolved result, wherein the evolved result is used for evaluation of a potential implementation of the service;
obtaining operational parameters for the processing of the first microservice;
obtaining operational parameters for the processing of the evolved first microservice;
comparing the operational parameters for the processing of the first microservice with the operational parameters for the processing of the evolved first microservice; and
based on the comparing of the operational parameters for the processing of the first microservice with the operational parameters for the processing of the evolved first microservice, using the evolved first microservice for subsequent implementation of the service.

2. The system of claim 1, wherein the second rule of the plurality of rules of the second microservice is randomly selected.

3. The system of claim 1, wherein the creating the evolved first microservice is triggered based on a period.

4. The system of claim 1, wherein the message is a first type of a plurality of types of messages for the first microservice.

5. The system of claim 1, wherein the message is a first type of a plurality of types of messages for the first microservice, and wherein the using of the evolved first microservice for implementation of the service is for subsequent messages of a second type of the plurality of types.

6. The system of claim 1, wherein the creating of the evolved first microservice further comprises loading a plurality of rules into a stem service.

7. The system of claim 1, the operations further comprising indicating in a directory whether the first microservice and the evolved first microservice is an evaluation microservice or an implemented microservice.

8. The system of claim 1, wherein the creating the evolved first microservice is triggered based on an operation parameter reaching a threshold.

9. A method comprising:
receiving, by a processor, a message associated with a service, wherein the message is for a first microservice that contributes to implementation of the service, wherein the first microservice comprises a plurality of rules;
subsequent to receiving the message, creating, by the processor, an evolved first microservice, wherein the creating of the evolved first microservice comprises replacing a first rule of the plurality of rules of the first microservice with a second rule of a plurality of rules of a second microservice;
processing, by the processor, the message using the first microservice to obtain a first result, wherein the first result contributes to the implementation of the service;
processing, by the processor, the message using the evolved first microservice to obtain an evolved result, wherein the evolved result is used for evaluation of a potential implementation of the service;

obtaining, by the processor, operational parameters for the processing of the first microservice;

obtaining, by the processor, operational parameters for the processing of the evolved first microservice;

comparing, by the processor, the operational parameters for the processing of the first microservice with the operational parameters for the processing of the evolved first microservice; and based on the comparing of the operational parameters for the processing of the first microservice with the operational parameters for the processing of the evolved first microservice, using, by the processor, the evolved first microservice for subsequent implementation of the service.

10. The method of claim 9, wherein the second rule of the plurality of rules of the second microservice is randomly selected.

11. The method of claim 9, wherein the creating the evolved first microservice is triggered based on a period.

12. The method of claim 9, wherein the message is a first type of a plurality of types of messages for the first microservice.

13. The method of claim 9, wherein the message is a first type of a plurality of types of messages for the first microservice, and wherein the using of the evolved first microservice for implementation of the service is for subsequent messages of a second type of the plurality of types.

14. The method of claim 9, wherein the creating of the evolved first microservice further comprises loading a plurality of rules into a stem service.

15. A computer readable storage medium storing computer executable instructions that when executed by a computing device cause said computing device to effectuate operations comprising:

receiving a message associated with a service, wherein the message is for a first microservice that contributes to implementation of the service, wherein the first microservice comprises a plurality of rules;

subsequent to receiving the message, creating an evolved first microservice, wherein the creating of the evolved first microservice comprises replacing a first rule of the plurality of rules of the first microservice with a second rule of a plurality of rules of a second microservice;

processing the message using the first microservice to obtain a first result, wherein the first result contributes to the implementation of the service;

processing the message using the evolved first microservice to obtain an evolved result, wherein the evolved result is used for evaluation of a potential implementation of the service;

obtaining operational parameters for the processing of the first microservice;

obtaining operational parameters for the processing of the evolved first microservice;

comparing the operational parameters for the processing of the first microservice with the operational parameters for the processing of the evolved first microservice; and based on the comparing of the operational parameters for the processing of the first microservice with the operational parameters for the processing of the evolved first microservice, using the evolved first microservice for subsequent implementation of the service.

16. The computer readable storage medium of claim 15, wherein the second rule of the plurality of rules of the second microservice is randomly selected.

17. The computer readable storage medium of claim 15, wherein the creating the evolved first microservice is triggered based on a period.

18. The computer readable storage medium of claim 15, wherein the message is a first type of a plurality of types of messages for the first microservice, and wherein the using of the evolved first microservice for implementation of the service is for subsequent messages of a second type of the plurality of types.

19. The computer readable storage medium of claim 15, the operations further comprising indicating in a directory whether the first microservice and the evolved first microservice is an evaluation microservice or an implemented microservice.

20. The computer readable storage medium of claim 15, wherein the creating the evolved first microservice is triggered based on receiving the message or an operational parameter.

* * * * *